(12) United States Patent
Tormasov et al.

(10) Patent No.: US 7,047,380 B2
(45) Date of Patent: May 16, 2006

(54) SYSTEM AND METHOD FOR USING FILE SYSTEM SNAPSHOTS FOR ONLINE DATA BACKUP

(75) Inventors: Alexander G. Tormasov, Moscow (RU); Serguei M. Beloussov, Singapore (SG); Maxim V. Tsypliaev, Moscow (RU); Maxim V. Lyadvinsky, Moscow (RU)

(73) Assignee: Acronis Inc., (VG)

( * ) Notice: Subject to any disclaimer, the term of this patent is extended or adjusted under 35 U.S.C. 154(b) by 19 days.

(21) Appl. No.: 10/925,928

(22) Filed: Aug. 26, 2004

(65) Prior Publication Data

US 2005/0027956 A1 Feb. 3, 2005

Related U.S. Application Data

(63) Continuation-in-part of application No. 10/624,858, filed on Jul. 22, 2003.

(51) Int. Cl.
*G06F 12/00* (2006.01)
(52) U.S. Cl. .......................................... 711/162; 714/6
(58) Field of Classification Search ...................... None
See application file for complete search history.

(56) References Cited

U.S. PATENT DOCUMENTS

| | | | |
|---|---|---|---|
| 5,410,667 A | 4/1995 | Belsan et al. | |
| 5,720,026 A * | 2/1998 | Uemura et al. | 714/6 |
| 5,819,292 A | 10/1998 | Hitz et al. | |
| 5,832,515 A | 11/1998 | Ledain et al. | |
| 5,905,990 A | 5/1999 | Inglett | |
| 5,996,054 A | 11/1999 | Ledain et al. | |
| 6,021,408 A | 2/2000 | Ledain et al. | |
| 6,038,639 A | 3/2000 | O'Brien et al. | |
| 6,061,770 A | 5/2000 | Franklin | |
| 6,101,585 A | 8/2000 | Brown et al. | |
| 6,173,377 B1 * | 1/2001 | Yanai et al. | 711/162 |
| 6,205,450 B1 | 3/2001 | Kanome | |
| 6,289,356 B1 | 9/2001 | Hitz et al. | |
| 6,341,341 B1 | 1/2002 | Grummon et al. | |
| 6,618,736 B1 | 9/2003 | Menage | |
| 6,799,258 B1 * | 9/2004 | Linde | 711/162 |
| 2004/0010668 A1 * | 1/2004 | Inagaki et al. | 711/162 |

\* cited by examiner

*Primary Examiner*—Mano Padmanabhan
*Assistant Examiner*—Duc T Doan

(57) ABSTRACT

A system for data backup includes a storage device, a backup storage device, and an intermediate storage device. Backup procedure is performed on-line and copies data blocks from the storage device into the backup storage device. When a write command is directed to a data storage block identified for backup that has not yet been backed up, the identified data storage block is copied from the storage device to the intermediate storage device, the write command is executed on the identified data storage block from the storage device, and the data storage block is copied from the intermediate storage device to the backup storage device. In case of an error accessing a block on the storage device, the block is marked as invalid. The intermediate storage device can be external to a file system of a computer that includes the storage device, or can be located in the storage device, or can be a separate partition of the storage device, or can be a file within a file system. The system suspends a write command to the storage device during the data backup process if the intermediate storage device has reached a selected data capacity; and copies a selected amount of data from the intermediate storage device to the backup storage device.

64 Claims, 15 Drawing Sheets

SYSTEM AND METHOD FOR USING FILE SYSTEM SNAPSHOTS FOR ONLINE DATA BACKUP

CROSS REFERENCE TO RELATED APPLICATIONS

This application is a continuation-in-part of U.S. patent application Ser. No. 10/624,858, filed Jul. 22, 2003, entitled SYSTEM AND METHOD FOR USING FILE SYSTEM SNAPSHOTS FOR ONLINE DATA BACKUP, which is incorporated herein by reference in its entirety.

BACKGROUND OF THE INVENTION

1. Field of the Invention

The present invention relates to computer systems and, more specifically, to a system and method for providing online data backup.

2. Background Art

Typically, an operating system of a computer system includes a file system to provide users with an interface while working with data on the computer system's disk and to provide the shared use of files by several users and processes. Generally, the term "file system" encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device. File systems may provide several functions. As discussed above, the most basic task of a file system is to provide access to files. File systems may also enhance system performance with additional functions such as, for example, caching, access markers and fault-tolerance.

Operating systems such as UNIX, Linux and Microsoft Windows manage computer file systems by defining a file object hierarchy. A file object hierarchy begins with a root directory and proceeds down the file tree. The file address is then described as an access path, e.g., a succession of directories and subdirectories leading to the file. This process of assigning a file address is called access path analysis or path traverse. For instance, the path "/r/a/b/file" contains the root directory (/), subdirectories "r", "a" and "b" and then the file. Typically, the processes within an operating system interact with the file system with a regular set of functions. For example, these functions usually include open, close, write and other system calls. For instance, a file may be opened by the open functions and this function acquires the file name as a target.

The file system may also include intermediate data structures containing data associated with the file system to facilitate file access. This data is called "metadata" and may include, for example, data corresponding to the memory location of the files, e.g., where the file is located in the hard drive or other storage medium. For example, in the context of a UNIX operating system, these intermediate data structures are called "inodes," i.e., index-node. An inode is a data structure that contains information about files in UNIX file systems. Each file has an inode and is identified by an inode number (e.g., i-number) in the file system where it resides. The inodes provide important information about files such as user and group ownership, access mode (read, write, execute permissions) and type. The inodes are created when a file system is created. There is a set number of inodes, which corresponds to the maximum number of files the system can hold.

Generally, a file system architecture that provides a recoverable file system is preferable to conventional file systems that lack this feature. In conventional systems, "careful" write and "lazy" write are the two main approaches to implementing input-output support and caching in file systems. Typically, a careful write is implemented in file systems developed for VAX/VMS and other similar closed operating systems. A lazy write is generally implemented in the HPFS (High Performance File System) of the OS/2 operating system and in most UNIX file systems.

In the event of an operating system failure or power supply interruption, for example, input-output operations performed at that time are immediately interrupted. Depending on what operations were performed and how far the execution of these operations had advanced, such interruption may affect the integrity of the file system. Violation of file system integrity may adversely affect the system's ability to locate and access files. For instance, a given file name may be present in the directory list, but the file system may not be able to find this file and access its content. In the most serious case, damage to the file system may lead to the loss of an entire volume of data. A file system that implements careful write does not necessarily prevent violation of file system integrity. Instead, the system implementing careful write arranges records so that any system failure, in the worst case, may only cause unpredictable, non-critical mismatches that the file system can eliminate at any time.

When a file system of any type receives a request for renewal of disk content, the file system must perform several sub-operations before the renewal can be completed. In file systems using the strategy of careful write, these sub-operations always write their data onto the disk. When allocating disk space, e.g., for a file, the file system first sets the appropriate number of bits in its bit card, and then allocates space for the file. If a power supply interruption occurs immediately after those bits have been set, the file system with careful write loses access to that part of the disk, which was represented with the pre-set bits, but the existent data is not destroyed. Sorting write operations also means that input-output requests are performed in the order of arrival. if one process allocates disk space and soon afterwards the other process creates a file, the file system with careful write will complete allocation of the disk space before starting the creation of the file—otherwise the overlap of sub-operations from two input-output requests might lead to the violation of file system integrity.

The FAT (file allocation table) file system in MS-DOS uses a through-write algorithm, in which renewals are performed immediately, e.g., the cache memory is written to at the same time as main memory. Unlike careful write, this method does not demand input operations sorting from the file system to prevent a violation of integrity. The main advantage of file systems with careful write is that, in case of a failure, the disk volume remains intact and can still be used—an intermediate launch of a volume recovery utility is not required. A volume recovery utility is needed for correction of predictable, non-destructive failures of the disk integrity that occur as a result of a failure. But this type of utility can generally be run at any time, usually when the system reboots. However, file systems with careful write have some disadvantages such as, for example, low performance, redundant non-optimized accesses to a disk, among other drawbacks.

A file system utilizing the careful write policy generally sacrifices its performance for reliability. On the other hand, a file system with lazy write typically increases performance due to the strategy of write-back caching. Write-back caching is a caching method in which modifications to data in the cache aren't copied to the cache source until absolutely necessary. This method of caching using the lazy write policy provides several advantages over the careful write policy, which accordingly increases system performance. First, the number of write operations to the disk may be reduced. Because write operations are immediately performed, input operations are not required and the buffer's content may change several times before being written onto the disk. Second, the speed of servicing application requests sharply increases because the file system may return control to the calling program without waiting for the write to the disk to be completed. Finally, the strategy of lazy write ignores intermediate inconsistent states of a volume that generally occur when several input-output requests overlap in time. This policy therefore simplifies the creation of a multi-threaded file system, which allows simultaneous execution of several input-output operations.

One disadvantage of the lazy write method is that, in some instances, a volume may acquire such an inconsistent state that the file system is unable to correct the volume in the event of a failure. Therefore, file systems with lazy write must always track the volume state. In general, a lazy write provides greater performance in comparison to the careful write policy but at the price of greater risk and user discomfort in the event of a system failure.

Recoverable file systems, such as, for example, Microsoft NTFS (Windows NT File System), may provide greater reliability than file systems with careful write, but also provide the performance of file systems with lazy write. Recoverable file systems guarantee integrity of the volume by using a journal of changes to handle transactions. For example, a journaled file system (JFS) is a file system in which the hard disk maintains data integrity in the event of a system crash or if the system is otherwise halted abnormally. The journaled file system maintains a log, or journal, of what activity has taken place in the main data areas of the disk. If a crash occurs, any lost data can be recreated because updates to the metadata in directories and bit maps have been written to a serial log. The journaled file system not only returns the data to the pre-crash configuration but also recovers unsaved data and stores it in the location in which it would have been stored if the system had not been unexpectedly interrupted. Accordingly, because recoverable file systems register all disk write operations in the journal, recovery may take only several seconds regardless of the volume size. The recovery procedure is generally precise and guarantees the return of the volume to the consistent state, in contrast to the typically inadequate recovery results of file systems with the lazy write policy, for example.

The high reliability of the recoverable file system has its disadvantages. For each transaction that modifies the volume structure, the file system must enter one record into the journal file for each transaction sub-operation. The integration of journal file records into packets may increase the efficiency of the file system: for each input-output operation, several records may be simultaneously added to the journal. Moreover, the recoverable file system may use optimization algorithms, such as those used by file systems utilizing lazy write. The file system may also increase the intervals between writing the cache contents to the disk, because the file system can be recovered if a failure occurs before the modifications are copied from cache to the disk. The utilization of these tactics to improve performance generally compensates for and may even exceed the performance losses incurred by protocolling the transactions.

But, neither careful write nor lazy write can guarantee protection of user data. If a system failure occurs at the moment an application writes to a file, then the file may be lost or destroyed. Moreover, in the case of a lazy write policy, the failure may damage the file system because the lazy write policy may have destroyed existing files or even made all information on the volume unavailable.

In contrast, recoverable file systems, such as, for example, Windows NTFS, possesses greater reliability in comparison with traditional file systems. First, recoverability of NTFS guarantees that the structure of the volume will not be destroyed because, in case of the system failure, all files will remain available. Second, although NTFS does not guarantee safety of user data in case of the system failure because some modifications in cache can be lost, applications can use the advantages of a write-through policy and NTFS cache reset to guarantee that the modifications of any files will be written to the disk at the required time. Both write-through (e.g., the policy requires an immediate write to the disk) and cache reset (e.g., a forced write of the cache content to the disk) are quite effective operations. NTFS does not require additional input-output to write modifications of several various data structures of the file system to the disk, because changes in these structures are registered in the journal file (e.g., during one write operation). If a failure occurs and the cache content is lost, modifications of the file system can be recovered using information from the file journal. Moreover, NTFS, unlike FAT, guarantees that, after the write-through or cache reset operation are completed, user data will stay safe and will be available even if a system failure occurs afterwards.

Generally, NTFS supports recovery of the file system using the concept of an atomic transaction. An atomic transaction is an operation in which either all steps in the operation succeed, or they all fail, e.g., either all actions of the transaction happen or none happen. Atomic transactions are commonly used to perform data modifications in a data store, where either all the data relating to the operation is successfully modified, or none of it is modified and the data remains as it was before the operation started. Accordingly, single changes on the disk composing a transaction may be performed atomically, e.g., during the transaction, all required changes are to be moved to disk. If the transaction is interrupted by a file system failure, modifications performed by the current moment are cancelled. After back-off, the database returns to the initial consistent state that it possessed before the transaction began.

Note that journaling is not a panacea for this type of system failure. For example, a user may open a file and place a large volume of data into the file. In the middle of a write operation, a failure occurs and the system reboots. And, after recovery, the file will typically be empty—all the information that the user wrote into the file since the file was open has disappeared. Thus, journaling file systems are not designed for recovery of data at any price, but are instead dedicated to provide non-contradiction of file system metadata at the moment of failure. In particular, this type of system typically operates as follows—a user opens a file and if it opens successfully, the file system notes opening in its journal by recording a transaction. Then the user may start writing. But the file system does not record copies of this data. Accordingly, after failure recovery is completed, the back-off procedure restores the last successful transaction that occurred, e.g., the opening of a new empty file.

Examples of journaled file systems include ReiserFS, JFS, XFS (Extended File System), ext3 and NTFS. A journaling file system may relocate the journal to another independent device to provide asynchronous access for the purposes of optimization. For instance, XFS and ReiserFS may use relocated journals.

XFS was created by Silicon Graphics (now SGI) for multimedia computers with the Irix OS. XFS is oriented to very large files and file systems. During journal construction, some metadata of the file system itself are written to the journal such that the entire recovery process is reduced to copying these data from the journal into the file system. Accordingly, the size of the journal is set when the system is created and is generally large, e.g., cannot be less than 32 Mb.

JFS was created by IBM for the AIX OS. OS/2 and Linux versions of JFS also exist. The journal size is typically about 40% of the file system size, but not larger than 32 Mb. This file system may contain several segments including the journal and data, and each of such segments can be mounted separately, e.g., "aggregates."

ReiserFS is an experimental file system designed for speed and survivability. The first prototype was called TreeFS. Currently, this system exists only for the Linux OS. Ext3 is the journaled superstructure for ext2 (Second-Extended File System)—the main and the most reliable file system for OS Linux. At present, this system is mainly developed by RedHat. One advantage of ext3 is that it does not alter the internal structure of ext2. The ext3 file system can be created from ext2 by running a journal creation program. An ext2 driver and an ext3 driver may be subsequently used to mount the file system and create the journal.

The development of file systems demonstrates that fault-tolerance and recoverability of file systems after failures are important design considerations. To provide maximum reliability, it is necessary to periodically copy all files as an immediate copy or cast of the file system, e.g., a snapshot. By its functionality, a snapshot is very similar to the journal of a recoverable file system, as they can both restore the system to the integral state. A snapshot guarantees full data recovery, but incurs high expenses in creation and storage.

Snapshot creation generally involves sector by sector copying of the whole file system, i.e., service information and data. If the file system is currently active, then files may be modified during copying—some files can be open for writing or locked, for example. In the simplest case, the file system can be suspended for some time and during that time a snapshot is recorded. Of course, such an approach cannot be applied to servers where uninterruptible activity of the file system is necessary.

Conventional file systems provide mechanisms to create snapshots without interrupting the operation of the file system. The following example is based on the Episode file system. Episode is designed to utilize the disk bandwidth efficiently, and to scale well with improvements in disk capacity and speed. Episode utilizes the metadata logging to obtain good performance, and to restart quickly after a crash. Episode uses a layered architecture and a generalization of files called containers to implement file-sets. A file-set is a logical file system representing a connected sub-tree, e.g., logical elements representing a linked tree. File-sets are the unit of administration, replication, and backup in Episode. The design of Episode allows disposal of several "file-sets" on one partition. The process of file-set cloning is used to create snapshots. The file-set clone is a snapshot, as well as a file-set, that can share data with the original file-set due to the copy-on-write techniques. The cloned file-set is available for reading only and it is generally placed on the same partition as the original file-set (e.g., available for reading and writing). Clones may be created very quickly and, most importantly, without interrupting access to data being copied. Cloning is accomplished by cloning all "anodes" to "file-sets". In this context, an anode is similar to a "mode" in BSD (the Berkeley Software Design version of Unix) with some minor distinctions. After copying each anode, both file-sets (new and old) point to the same data block. But the reference to the disk in the original "anode" acquires the COW (copy-on-write) flag, such that, during block modification, a new data block is created (at which point the COW flag is removed).

Generally, under a COW policy, when the system copies a string, the "real" string to be copied (e.g., its content or bytes) is not actually copied in memory with the copy operation. Instead, a new string is created and marked as COW, and it points to the original string. When the system reads this flagged string, it is redirected to the original string. In the event an application wishes to write to the string (e.g., modify it), then the system notes the COW flag and performs the actual copying of bytes. The COW approach saves memory, because the system may create as many copies of a string as desired without requiring multiple allocations (unless they are modified). COW also improves the speed of the system, because the system requires less resources to copy a string under the COW methodology.

As a result, this file system allows the user to sort in time the changes that occur in the file system. This can be achieved because all modifications performed in the file system (or in any part of it) during a given period of time are written to a separate tree. These separate trees may be sorted in time and represent a full version of the file system modifications. Thus, to find the file state at a given moment, a user may search sequentially through the required file in the tree closest in time, e.g., if the desired file state was not found there, the user may search in the previous tree, etc.

Snapshots are also implemented in the WAFL (Write Anywhere File Layout) file system. WAFL is designed for network file servers. The main purpose of WAFL algorithms and data structures is to support snapshots, which, in this case, may be read-only file system clones. To minimize the disk space required by the snapshot, WAFL uses the copy-on-write technology. Moreover, WAFL snapshots may obviate the necessity of checking the file system integrity after a failure, which allows the file server to quickly start.

Typically, WAFL automatically creates and deletes snapshots according to a defined schedule and keeps a selected number of snapshot copies to provide access to old files. The copy-on-write technology is used to prevent doubling of disk blocks (in the snapshot and active file system). Only when the block in the file system is modified, will the snapshot containing this block be committed to disk space. Users may access the snapshots via NFS (Network File System). An administrator can use snapshots to create backup copies independently of the file system operation.

FIG. 1 illustrates a file system structure of a conventional WAFL system. As illustrated in FIG. 1, WAFL stores metadata in files and uses three types of files: (1) an "inode" file, containing "inode" for the file system; (2) a block map file, which identifies spare blocks and (3) an inode file map, identifying a spare inode. In this context, the term "map," not "bitmap," is used as these files may use more than one bit for each record. By storing metadata in files, a WAFL system may write blocks of metadata to any place on the disk. This design allows the system to use copy-on-write technology during the creation of snapshots, e.g., the WAFL system writes all data, including metadata, to a new place on the disk, without re-writing old data. Note that if the WAFL system could store data to any fixed place on the disk, this process would not be possible.

As shown on FIG. 1, the structure of a WAFL system may be represented as a tree of blocks, shown generally at 10, with a root inode 15 pointing to the inode file 20, and with metadata and files placed below. The root inode 15 is in the root of the file tree 10. The root inode 15 is a specific inode describing the inode file 20. The inode file 20 contains inodes describing other files in the file system, including the block map and inode map files, 25 and 30, respectively. The data blocks of all files form the "leaves" of the tree.

FIG. 2 is a more detailed version of FIG. 1. FIG. 2 illustrates that files are composed of separate blocks and large files have additional links between modes and real data blocks. Loading the WAFL system requires locating the root of the file system tree. Accordingly, the block containing the root inode 15 is an exception to the rule "write to any place." The block containing the root inode 15 should be located in a fixed place on the disk.

FIG. 3 illustrates the creation of a snapshot in WAFL. In order to create a virtual copy of a tree of blocks, WAFL simply copies the root inode 15. This process is depicted on FIG. 3. FIG. 3a is a simplified version of the original file system in which internal nodes of the tree, such as inodes and indirect blocks, are omitted for clarity. FIG. 3b shows the process in which WAFL creates a new snapshot 35 by copying the root inode 1 5. The copied inode 35 becomes the root in the tree of blocks and it represents a snapshot of the root inode 15 in the same way root inode 15 represents the real file system. When the snapshot's inode 15 is created, it points to the same disk blocks, shown generally at 40, as the root inode 15. Therefore, WAFL does not change a snapshot's blocks because it copies new data to the new place on the disk. Accordingly, a new snapshot does not take additional disk space (excluding the space taken to create the snapshot's inode).

FIG. 3c depicts the situation when a user modifies a data block 40, e.g., data block D. WAFL writes new data to the block D' on the disk and modifies the pointer to point to the new block in the active file system. The snapshot 35 continues to point to the old block D, which remains unmodified on the disk. As files are modified or deleted in the active file system, the snapshot 35 refers to the growing amount of blocks, instead of being associated with the active file system. Moreover, the snapshot 35 will take more and more disk space.

Different file systems have different methods for creating snapshots. For example, the manner in which snapshots are created in WAFL provides advantages over the corresponding process of Episode. In Episode, instead of copying the root mode, a copy of the whole inode file is created. This significantly loads the disk subsystem and consumes a lot of disk space. For example, a 10 Gb file system with one inode per each 4 Kb of disk space will allocate 320 Mb for an inode. Accordingly, in this type of file system, creation of a snapshot through inode file copying will generate 320 Mb of disk traffic and take 320 Mb of disk space. Creation of ten such snapshots will take nearly one third of the free disk space, after taking the modification of blocks into account. In contrast, by copying the root inode, WAFL quickly creates a snapshot without overloading the disk subsystem. This advantage is important, because WAFL creates snapshots every several seconds to implement a mechanism of recovery after failures.

FIG. 4 shows a transition from FIGS. 3b to 3c in more detail. When a disk block is modified, all of its content is relocated to a new location. Accordingly, the block's parent must also be updated or modified to point to a new location. In addition, the parent's parent must also be re-written to a new location and so on.

If the file system performed a write for several blocks at each modification, the system would incur substantial performance penalties. Instead, WAFL caches several hundreds of modifications before writing. During the write, WAFL allocates disk space for all data in cache and performs a disk operation. As a result, blocks that are often modified, such as indirect blocks or inode file blocks, are written once during cache reset instead of each time the data is modified.

Accordingly, due to the disadvantages associated with conventional data backup systems, there is a need for a data backup process that is both reliable and efficient. Moreover, there is a need for an online data backup process that allows a computer system to remain online while data is being backed-up and also addresses the disadvantages associated with conventional back-up systems.

BRIEF SUMMARY OF THE INVENTION

The present invention relates to a system and method for providing online data backup for a computer system.

In an exemplary embodiment of the present invention,

BRIEF DESCRIPTION OF THE DRAWINGS/FIGURES

FIGS. 9-1 and 9-2 are a flow chart illustrating the method of online data backup of the present invention;

DETAILED DESCRIPTION OF THE INVENTION

The present invention provides a system and method for file system backup without suspending online application programs using a file system snapshot. Accordingly, the present system and method significantly increase computer system availability and allows backing up without interrupting computer services.

The computer file system is usually located on the block data storage and typically interacts with storage at the level of blocks. For example, read and write operations are performed in connection with data areas that have sizes that are divisible by the size of one block. The sequence of the blocks in the storage is ordered and each block has its own number. The computer system may include several such storages and the file system may take only a portion of one such storage, the whole storage, or several such storages or their parts. On the disk or storage device, these type of storages are usually located in partitions, taking the entire partition.

Figure 1:
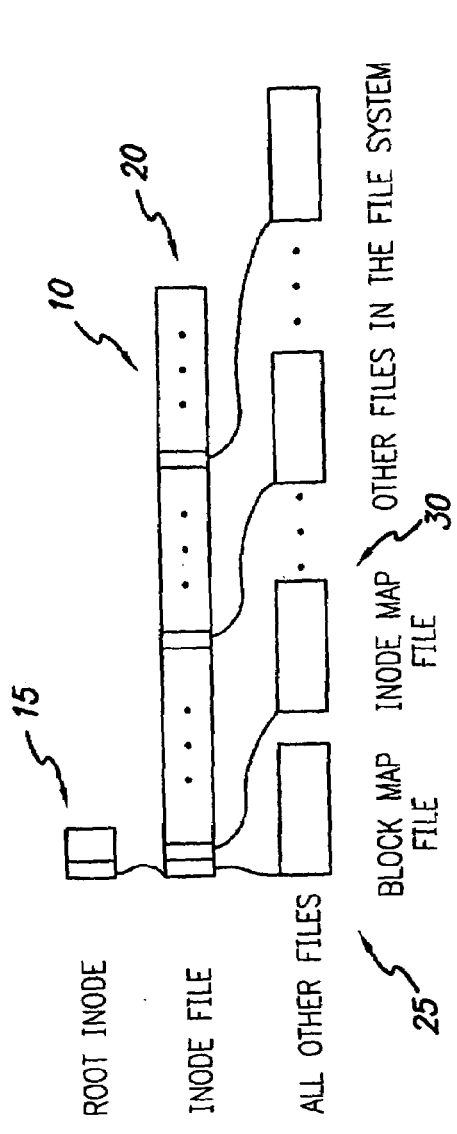
FIG. 1 is a conventional WAFL file system.
Figure 2:
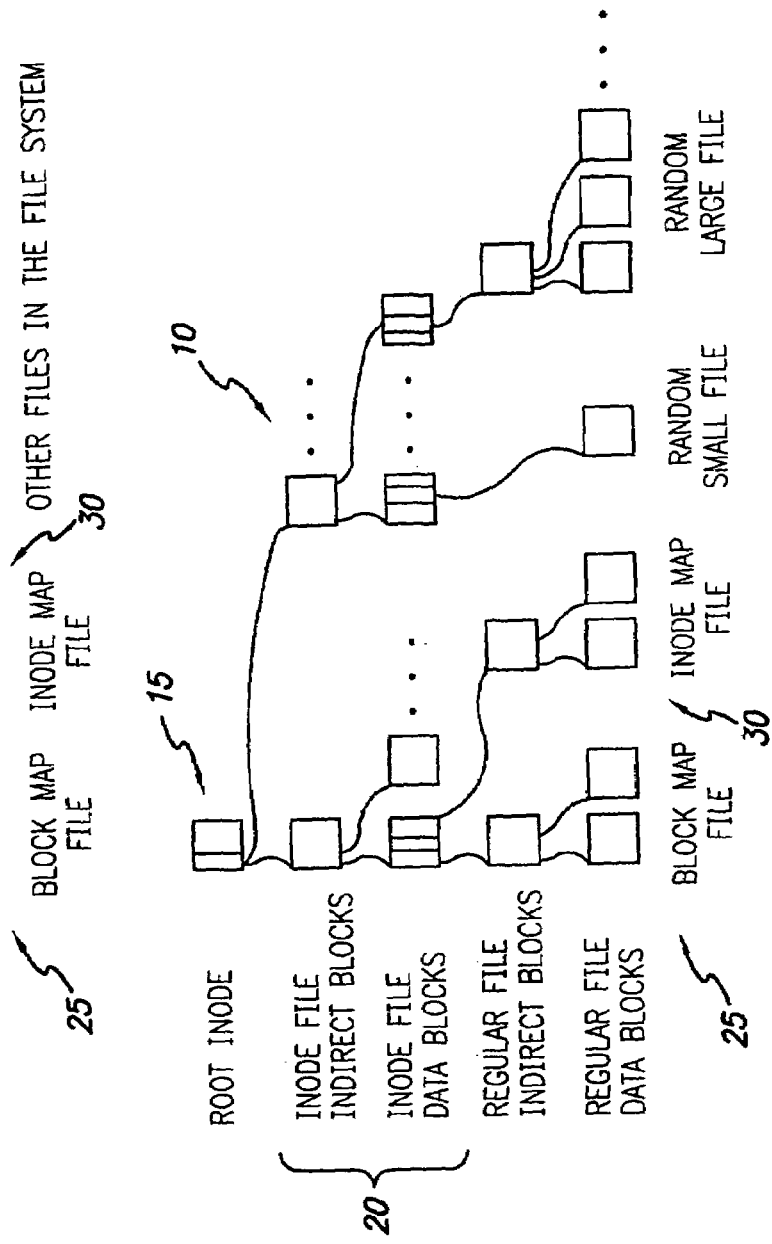
FIG. 2 is another illustration of the conventional WAFL file system.
Figure 3:
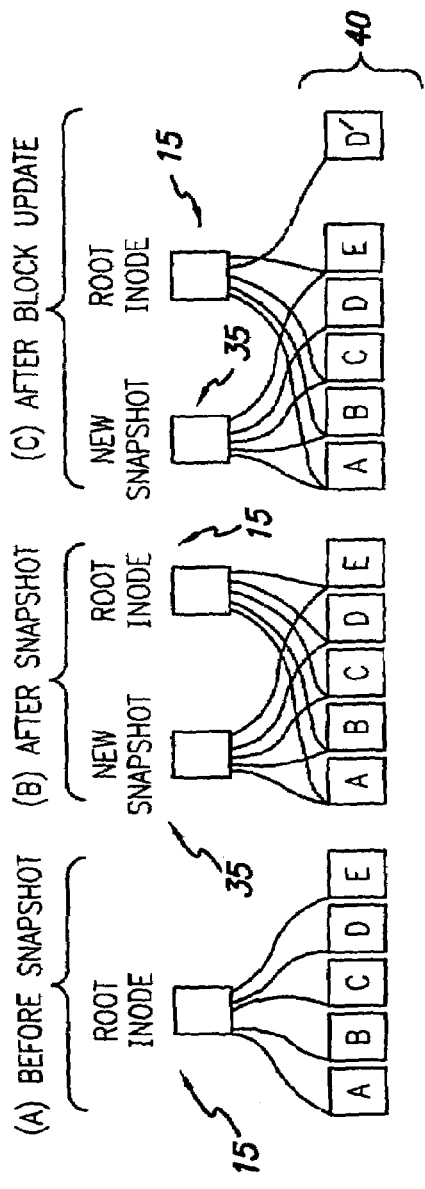
FIG. 3 shows the process of creating a snapshot of the conventional WAFL file system.
Figure 4:
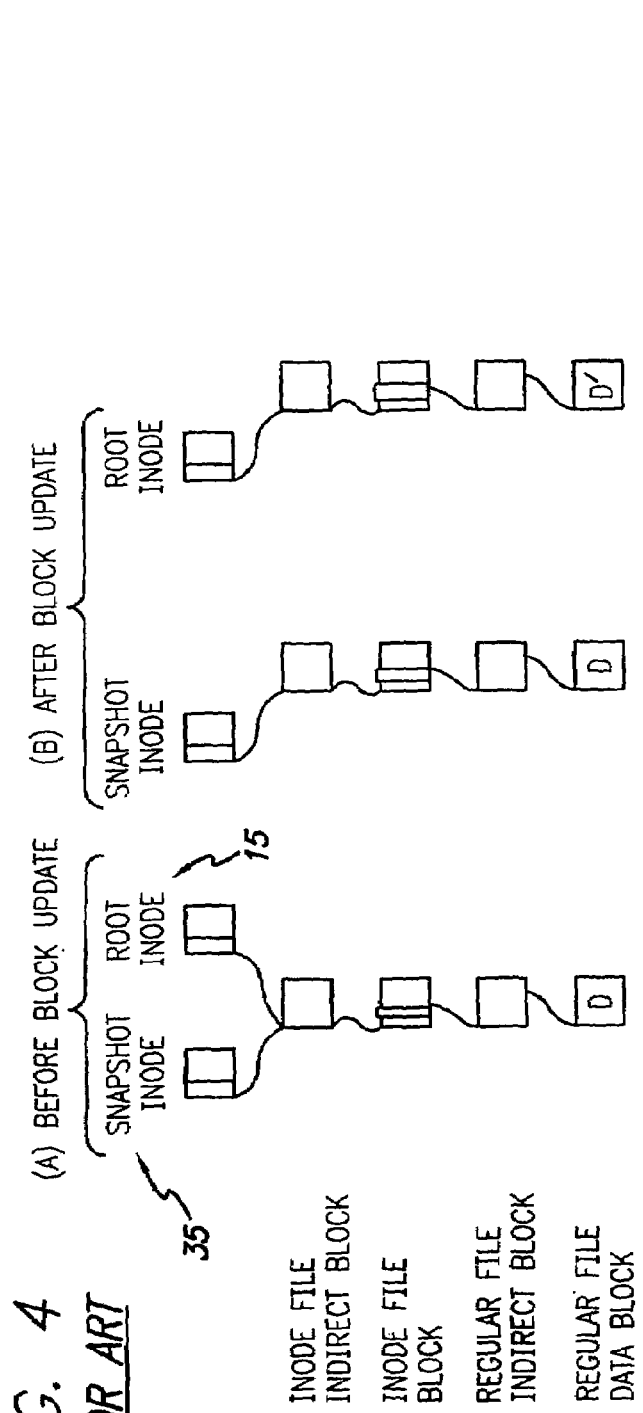
FIG. 4 is another illustration of the process of creating a snapshot of the conventional WAFL file system.
Figure 5:
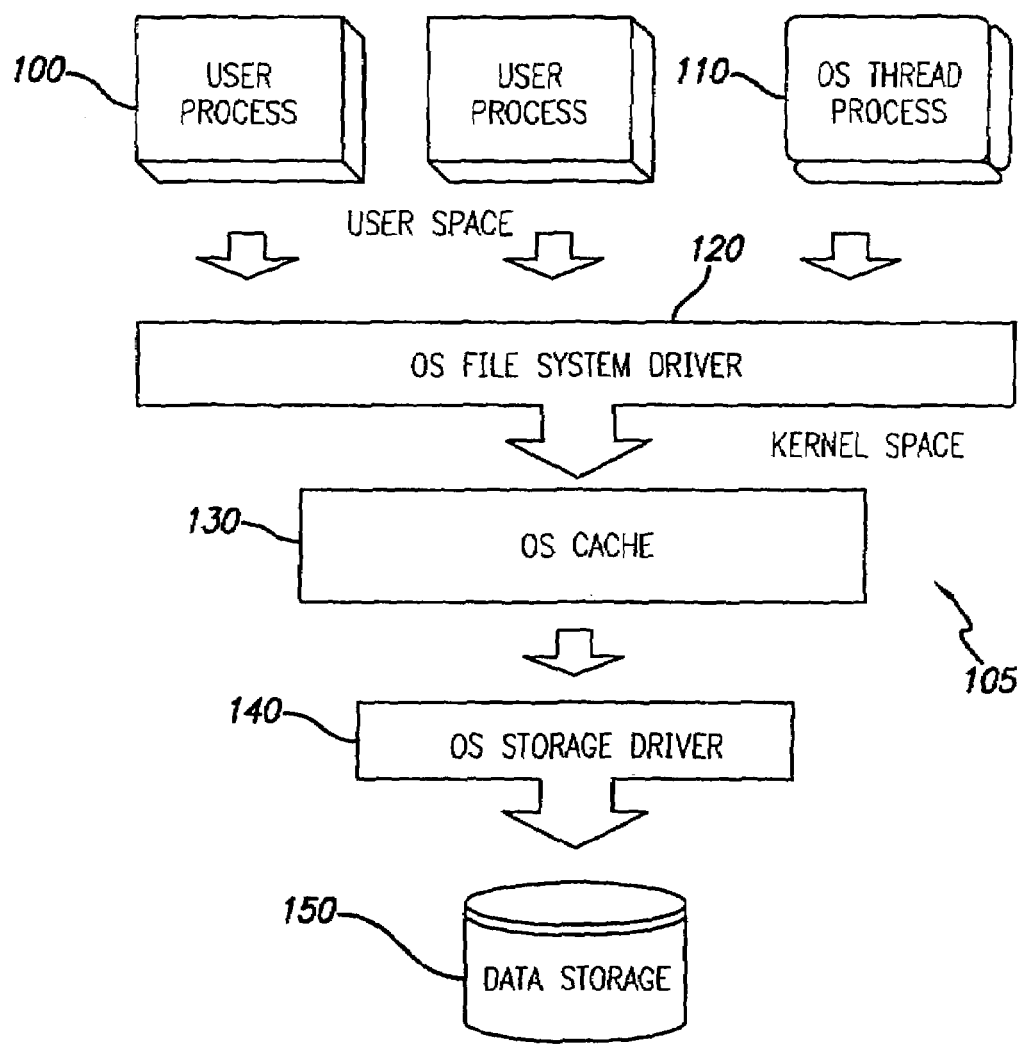
FIG. 5 shows an exemplary embodiment of the computer system of the present invention.

The file systems may be subdivided into several categories, including the housekeeping data of the file system volume, file metadata, file data, and free space not occupied by the other data. A file system driver embedded into the operating system may provide the servicing for the file system. FIG. 5 shows an exemplary embodiment of the computer system of the present invention, shown generally at 105. The computer system 105 includes a data storage device 150 that may be accessed by one or more user processes 100 or OS thread processes 110. OS user processes 100 or OS thread processes 110 may request to read or write data to the data storage 150 via a file system request.

This request may be directed to the file system driver 120, which defines where in the data storage the relevant data blocks are located. The request is then directed to the OS cache 130 where the requested data may be currently cached. If the requested data is located in the OS cache 130, the system may complete the requested operation by allowing the user process 100 or OS thread process 110 to read and write of the cached data. If the requested data is not located in the OS cache 130 or is otherwise unavailable (e.g., the space in cache must be freed pursuant to an OS algorithm), the request is transmitted for execution to the OS storage driver 140. The OS storage driver subsequently performs the requested operation on the selected data located in the data storage 150.

The OS storage driver 140 may interact with the storage device 150 in block mode. As discussed above, in the context of data management, a block is a group of records on a storage device. Blocks are typically manipulated as units. For example, a disk drive may read and write data in 512-byte blocks. Accordingly, the OS storage driver 140 may receive requests for data read and write using blocks of the selected block size. Typically, each data block is associated with a number or label corresponding to the type of operation to be performed. Thus, the driver associated with the data write operation acquires a set of numerical pairs (e.g., the data block and number) in order to process the data write command.

Figure 6:
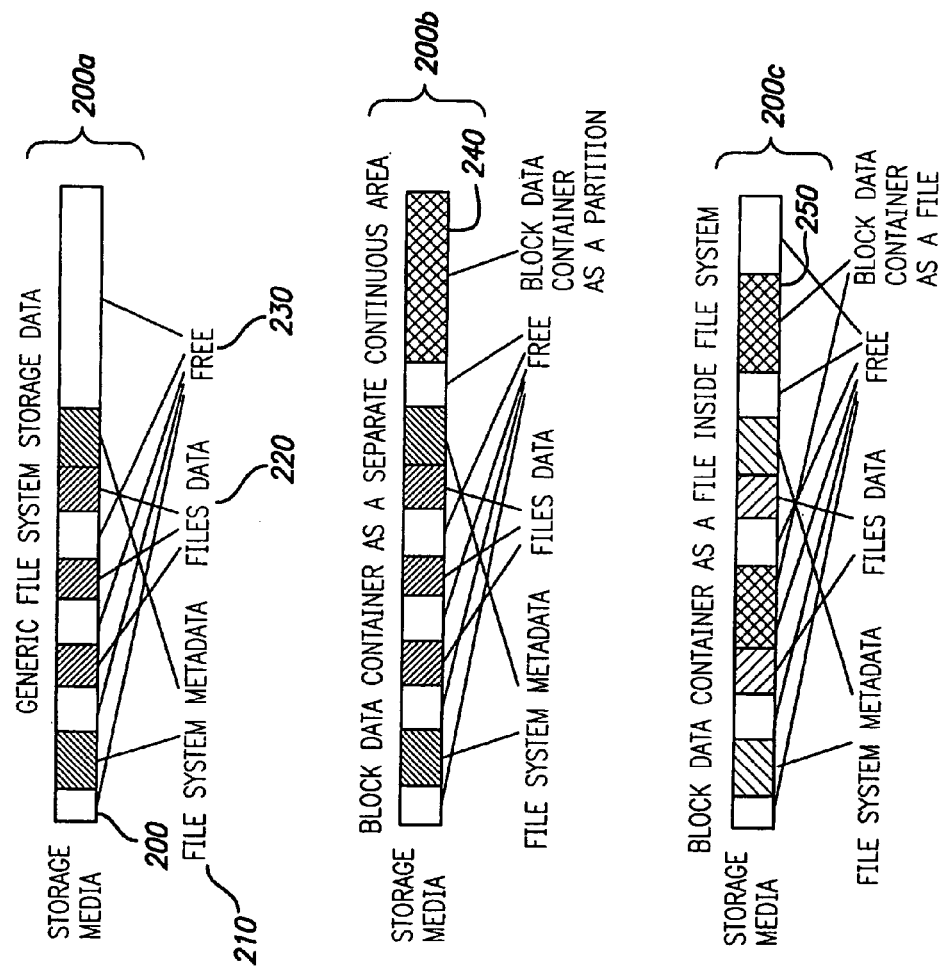
FIGS. 6a, 6b and 6c show exemplary embodiments of the system storage, including exemplary embodiments of the intermediate block data container of the present invention.

FIG. 6 illustrates an exemplary embodiment of the system storage device. Storage medium 200 is a file system storage data device or location. From the point of view of the file system, the blocks of data stored in the block data storage medium 200 can be characterized into several different classes. Depending on the file system type, the storage medium 200 can store data specific for the volume, metadata of the file system 210, file data 220, or free space 230 not currently taken by other data. Generally, a specific data type may be allocated to an entire data block and different data types cannot be combined in one block. But under specific circumstances, a file system may combine different data into one block (e.g., ReiserFS or Microsoft Windows NTFS).

Thus, by copying all data blocks that are not free (e.g., all blocks except entirely free blocks 230), the system may obtain a file system snapshot that serves as a copy of its state at a current moment of time. Although listing the file system blocks is not a requirement, listing may be used to optimize the space used by the backup procedure. In the event this information cannot be acquired by the system, the block fetching procedure may select all of the blocks associated with storing any file system data, including free blocks.

As discussed above, a data backup operation is time consuming. Thus, in order to conform backed up data with any specific state at a given moment, the data being copied must not change before the backup operation is completed.

Figure 7:
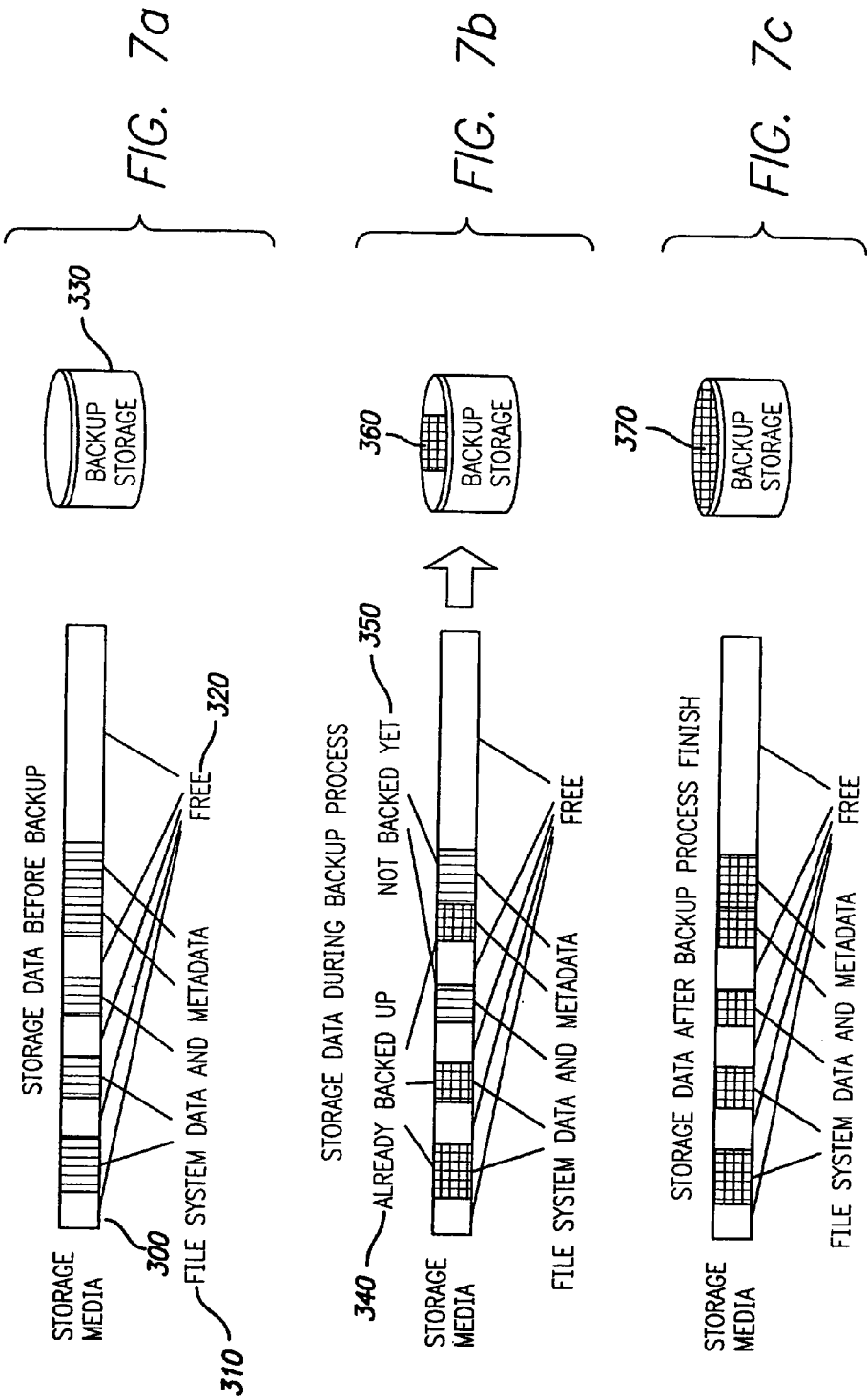
FIGS. 7a, 7b and 7c show the process of data backup.

Typically, this task is not difficult if the data storage and the file system associated with the storage are not connected to any active computer or is otherwise blocked from data modification. Basically, the risk of nonconforming data is reduced if there are no processes able to modify data. FIG. 7 illustrates a conventional consecutive write process of the file system data during a typical (e.g., not online) data backup procedure. In order to carry out the data backup, the data storage medium 300 must be re-written to the backup storage 330. FIG. 7a shows the status of the storage data before the backup process has been initiated. In order to optimize the backup process by increasing performance and reducing space requirements, the system will only copy the occupied areas 310 and not the free blocks 320. During this process, as shown in FIG. 7b, the file system data subject to backup may be in the two different states: (1) data that is already backed up 340 to the storage and (2) data that is not yet backed up, but only scheduled for backup 350. When backup is completed, as shown in FIG. 7c, all of the data is now located in the backup storage 370, and the file system and main data storage are subsequently ready for user operations and access.

If the file system is connected to an active computer and there are file system processes and user applications working with data during the backup process (e.g., online backup), then the task becomes more complicated. On-line backup is typical for servers with a high level of accessibility and therefore cannot be stopped to allow backup to be completed.

Figure 8:
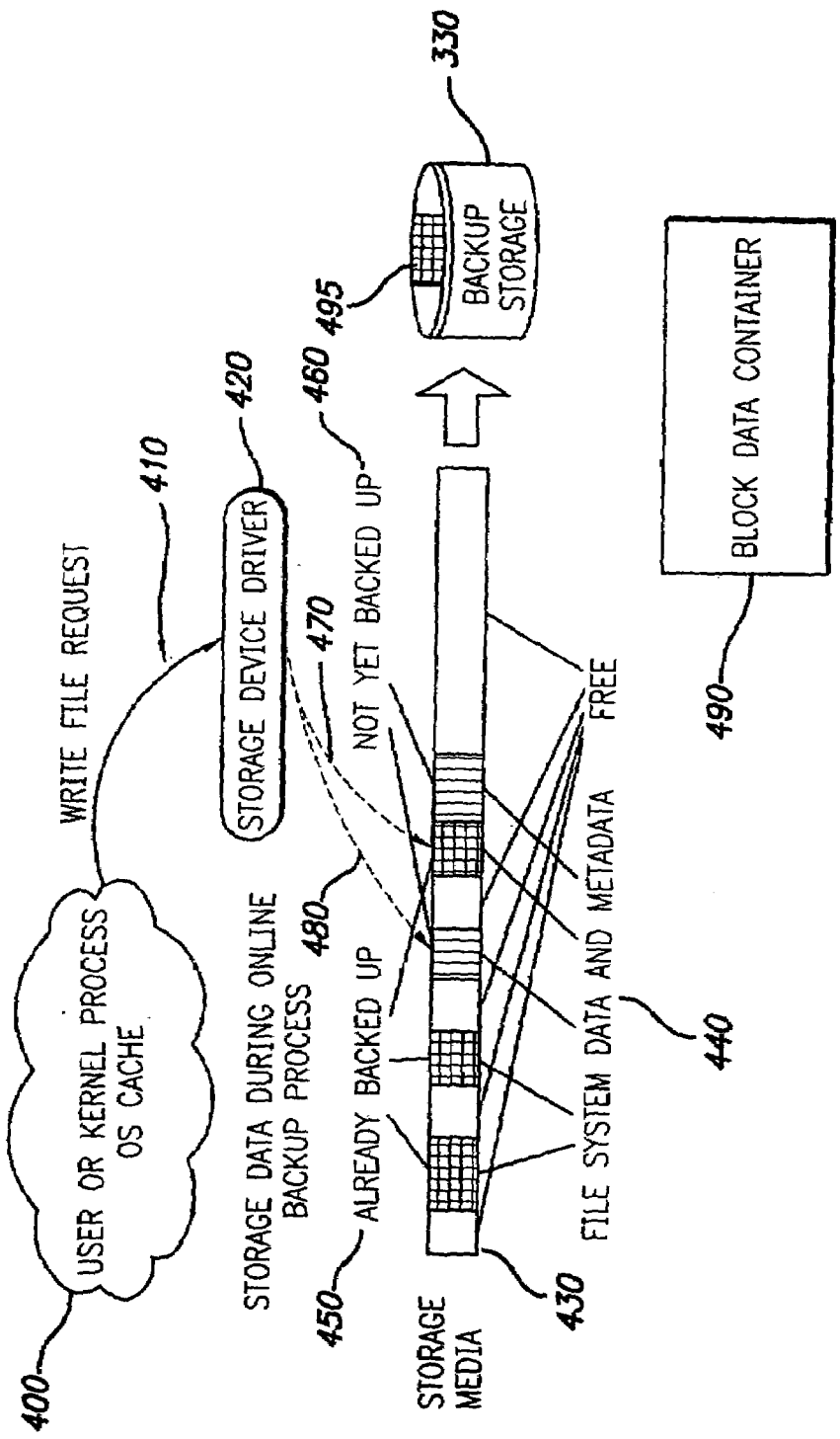
FIG. 8 shows an exemplary embodiment of the data backup process of the present invention.

FIG. 8 illustrates an exemplary embodiment of the online backup process that addresses the shortcomings of offline data backup. For the purposes of illustration, the following example assumes that the backup process for the data of block data storage 430 is launched such that the backup process may be performed within the off-line backup procedure. Initially, a user process or file system process 400, such as, for example, a disk cache, issues a write request 410 to the data storage that is received by the storage device driver 420. In response to write request 410, the storage device driver 420 transmits modification requests, shown as 470 and 480, to the appropriate stored data. In this example, the modification requests 470 and 480 are directed to data that is subject to the backup process 440. Accordingly, the modification process may request the data area 450 that has already been copied to the backup storage 495 (i.e., request 470) or data 460 that has not yet been copied or backed-up (i.e., request 480). Request 470 can be performed without damaging the backed up data, because backup is a one-pass process that does not require a return to data areas that have already been processed. But, in conventional systems, request 480 cannot be performed because the integrity of the backed-up data can be adversely affected. For example, a modified block that does not belong to the given copy can penetrate into the backup copy. This can make the correct recovery of the file system state impossible because data may refer to different points in time. As a result, the integrity of the data would be compromised.

To solve this problem, one exemplary embodiment of the present invention includes a temporary data storage container 490 designed to address the situations discussed above and utilizes a method of data backing up into a backup storage, described below.

The backup procedure of the present invention operates at the level of the underlying file system and may be implemented with a file system based on a block storage principle. The method of the present invention includes a procedure to define the data and metadata of the file system by the number of the block to which the subject data belongs. For internal purposes, the backup procedure efficiently defines which blocks have been copied or are subject to being copied.

As discussed above, the intermediate data storage container 490 may be any storage device suitable for storing data. For example, intermediate data storage 490 may be a temporary buffer based on the block design of the data storage 330. Intermediate data storage container 490 may be a memory located external to the backed up data storage space 330. Alternatively, or in addition, intermediate data storage container 490 may be placed in a dedicated part of the data storage space 330, which can represent a separate partition of the storage (shown as block data container 240 in FIG. 6*b*) or as a file within the file system (shown as block data container 250 in FIG. 6*c*) that has been reserved for the purpose of providing a temporary data storage container.

Figures 1, 9:
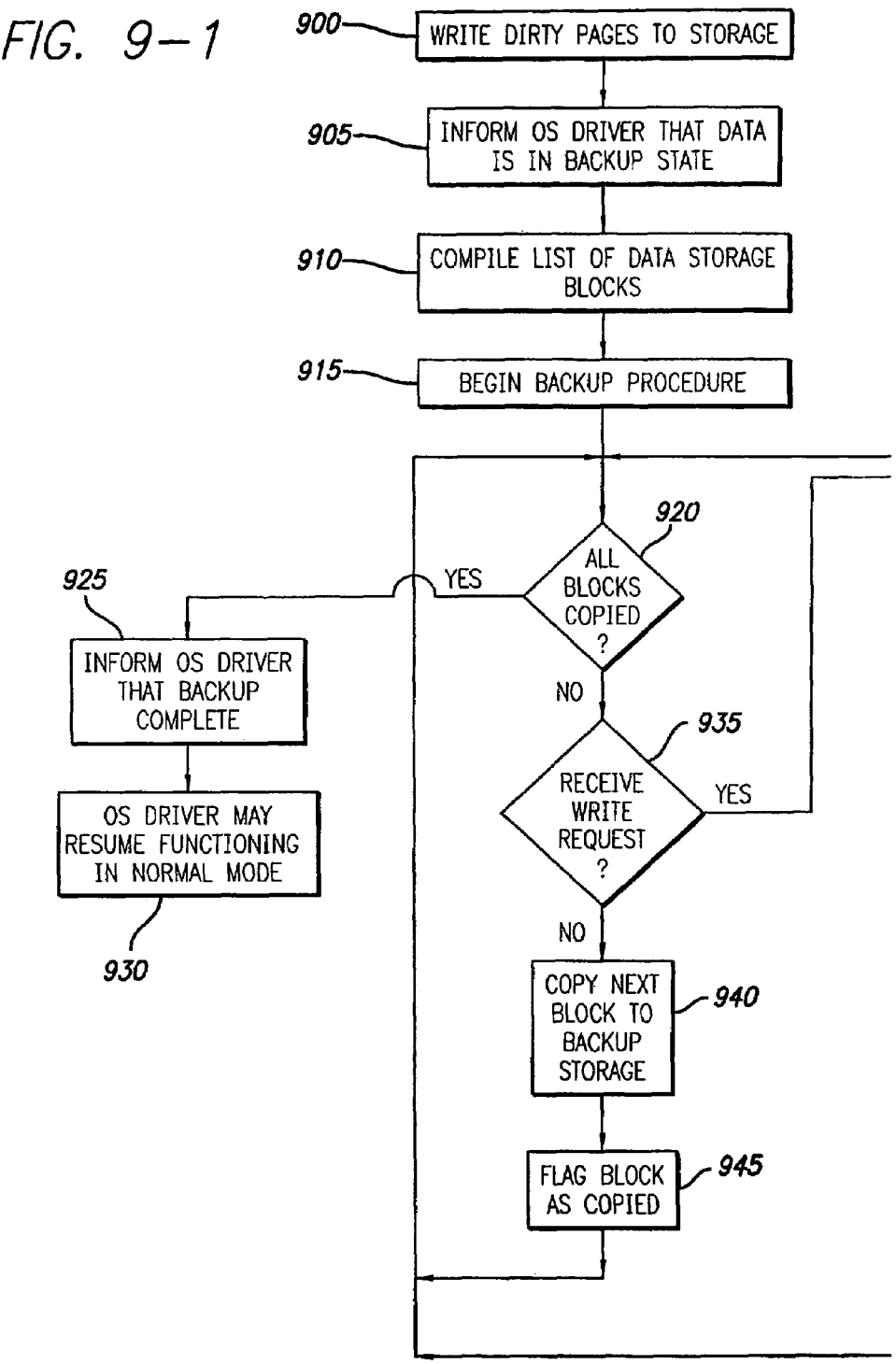
Figures 2, 9:
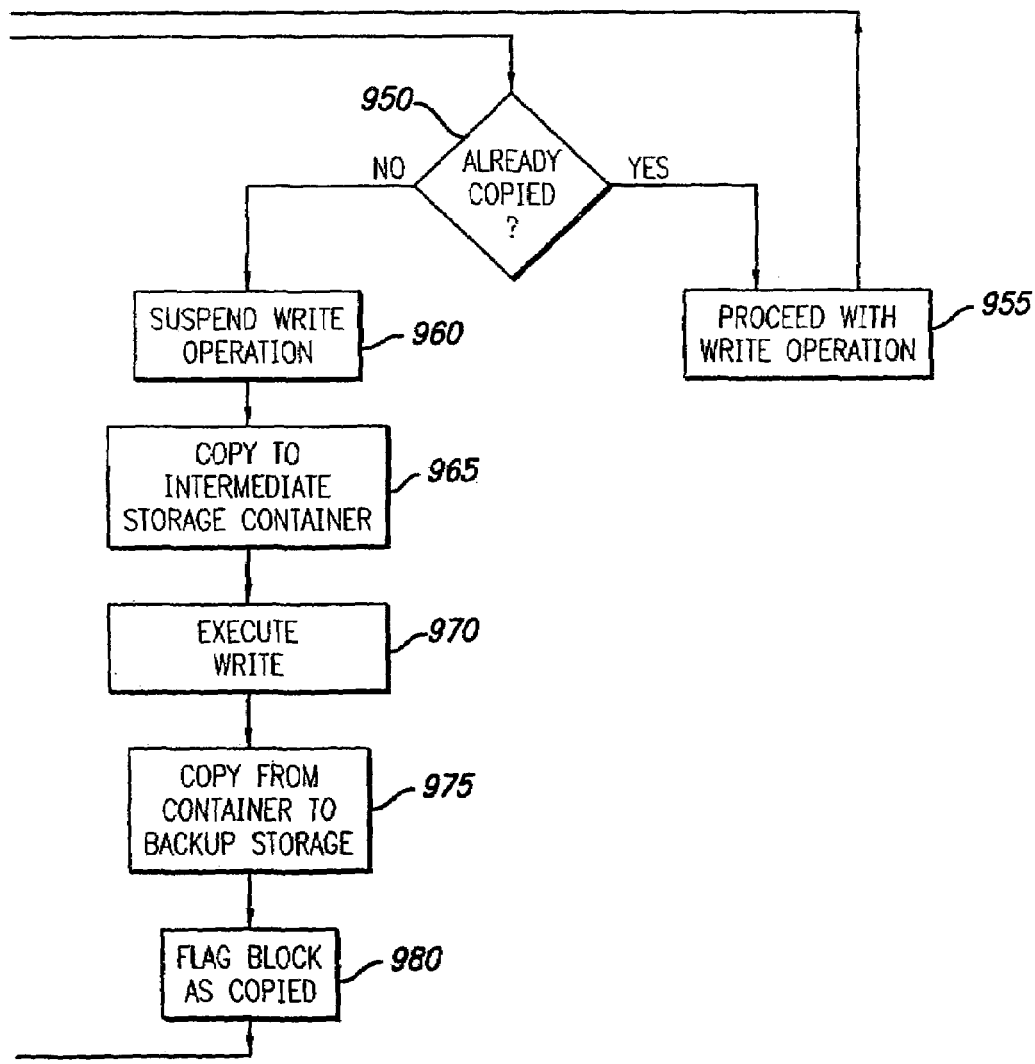

FIG. 9 shows an exemplary embodiment of the online backup procedure of the present invention. The on-line backup procedure of the present invention may begin with the step of informing the operating system driver responsible for servicing the data storage that the data is in the backup state, shown at step 905. In an alternative embodiment, the system may call an operating system cache reset procedure to write "dirty" pages into the data storage before informing the operating system driver about the initiation of the backup process, as shown at step 900. This procedure increases the actuality of the data stored in the snapshot. After the system has informed the operating system driver, the system then compiles the list of data storage blocks at step 910. This list contains the file system data of different types that should be backed-up during the backup process. Once the list has been generated, the backup procedure may begin at step 915. Until the system reaches the end of the list (see step 920) or receives a write request (see step 935), the system goes down the list and copies the blocks into the backup storage at step 940. On completion of each block backup the block is flagged or marked as backed-up, as shown at step 945. During the backup process, blocks preferably remain invariable. When the last block is backed-up or the backup procedure is canceled, then at step 925, the OS driver servicing the data storage is informed that the backup procedure is completed and the driver may continue functioning in the customary mode at step 930. Note that cancellation may be induced by the appearance of fatal errors, by the user's decision or by the processes of the operating system.

The OS driver servicing the data storage is preferably able to communicate with system agents running the backup procedure. Once the backup procedure is initiated, this driver provides the backup procedure with the data block numbers that have been requested for write into the data storage by the operating system or a user process.

The backup procedure, depending on the state of its internal data, may be responsible for determining whether or not each requested block was copied to the backup storage. If the block was not copied, then the OS driver suspends the block write and waits until the block has been copied and subsequently released.

In one exemplary embodiment, the requested block may be released by continuing the backup procedure (e.g., when the requested block is next block in the backup sequence). But, the request processing time can be very long and usually this type of mode is unacceptable for online systems.

Figure 10:
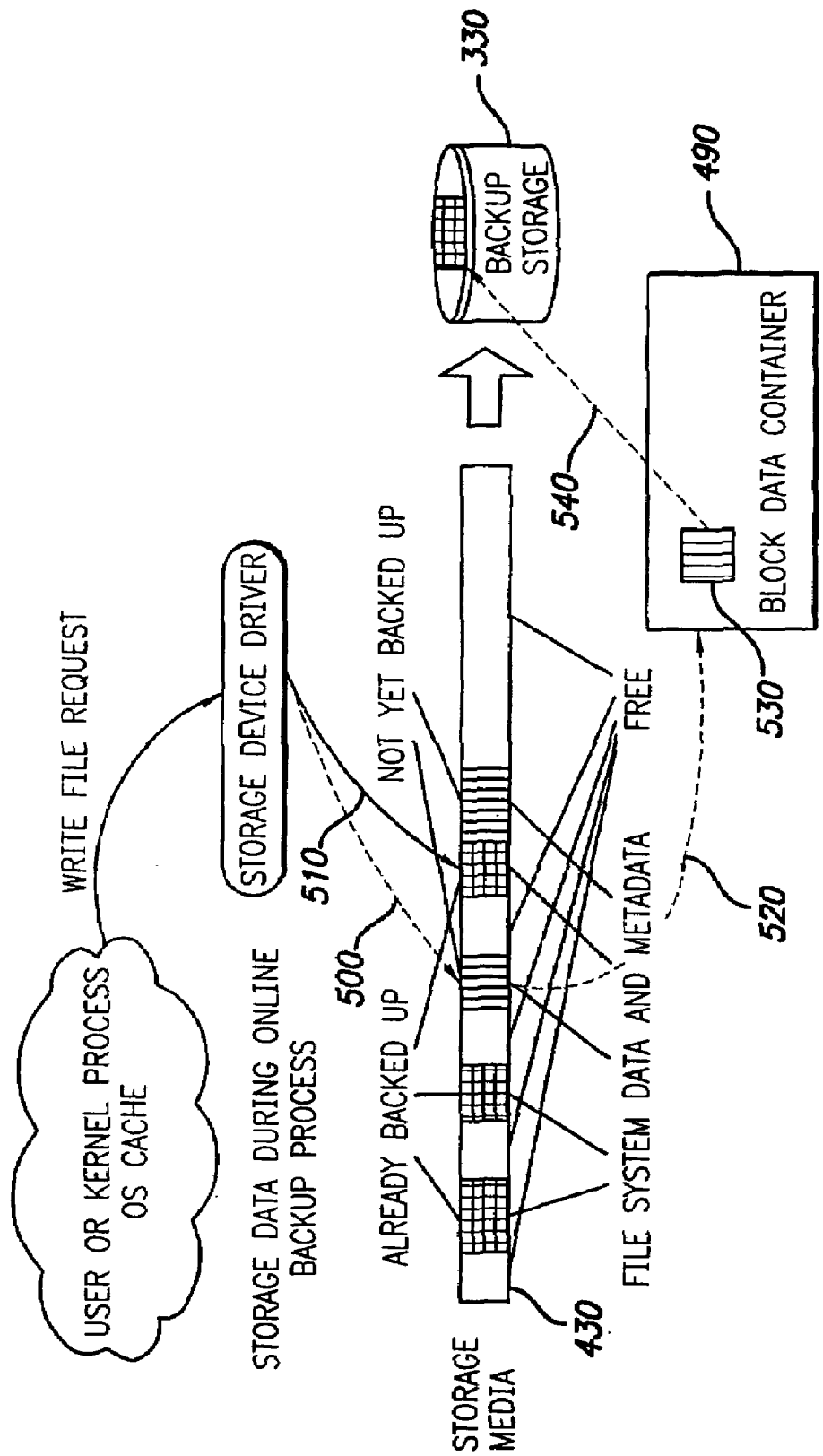
FIG. 10 shows an exemplary embodiment of the data backup process of the present invention.

In another exemplary embodiment, the block release may be performed in connection with a specific container used as an intermediate data storage. FIG. 10 shows an exemplary embodiment of the present invention in which the system utilizes a block data container to manage the block release process. When the data storage driver receives a request to write a block into the area already copied by the backup procedure 510, the required write is performed without limitations (as shown at step 955 in FIG. 9). But, if the incoming write request (shown as 500 in FIG. 10) is directed to an area not yet backed-up, then the write process is suspended and the current state of the given data area is copied to the intermediate data storage container 490, as shown at 520 in FIG. 10 (and shown as steps 960 and 965 in FIG. 9). When the copy procedure is completed, the system will allow the write procedure 500 to be executed (as shown at step 970 in FIG. 9). Thus, the content of the data block, shown as 530, at the moment the backup procedure commenced is stored in intermediate block container 490. The content 530 will be copied from container 490 by the backup procedure when required, as shown at 540 (and at step 975 in FIG. 9). The block will be flagged (as shown at step 980 in FIG. 9) and the backup process will continue. Note that the write procedure (shown at step 970) may be executed in parallel with the process of copying data from the intermediate block container to the backup storage device (shown at step 975). Accordingly, the system need not wait until the original write operation is complete to initiate the backup copy operation. Moreover, the step of writing the content of the intermediate block container 490 into the backup storage device 330 may be performed in a substantially asynchronous manner (e.g., it is not necessary to wait until the intermediate block container 490 is flushed to process the next incoming block write request if the container 490 has not over-flowed). Thus, the delays that result from writing to the main storage are reduced to a minimum and the programs running on the computers connected to the data storage can continue working substantially without pause.

Figure 11:
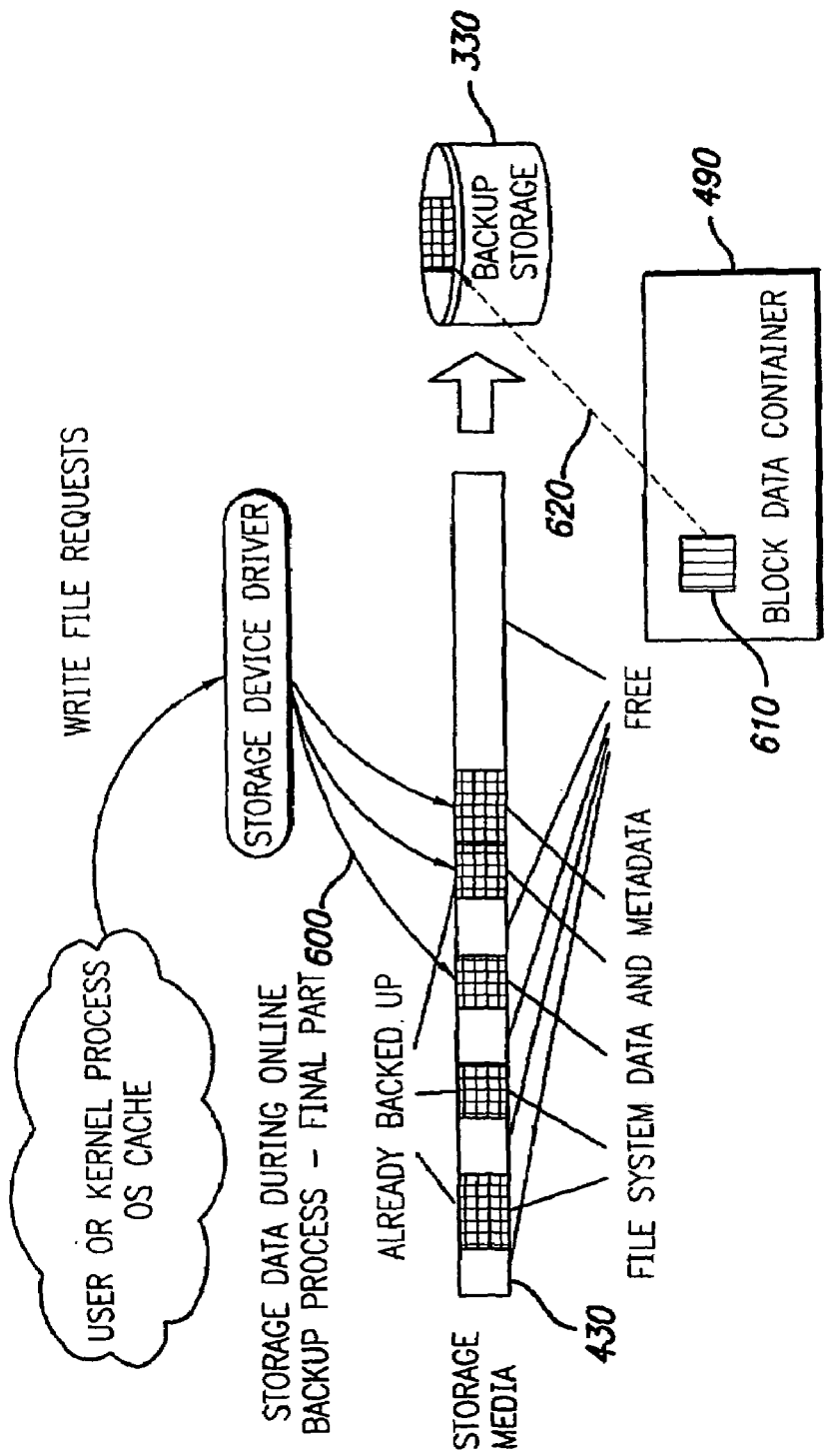
FIG. 11 shows an-exemplary embodiment of the data backup process of the present invention.

Data from the intermediate storage container can be re-written to the backup storage when the write procedure of data located in the main storage has been completed or at any other appropriate time. FIG. 11 illustrates an exemplary embodiment of the process for copying data from the block data container 490 to the backup storage device 330. In this situation, although the backup process of the main storage is completed and write requests 600 directed to any regions of the data storage are performed by the driver immediately, the system must still write the data 610 that is temporarily stored in the data container 490 to the backup storage 330, shown as 620. Thus, an additional write process 620 and routine computer activity may both occur in the concurrent mode depending on the backup data storage.

Figure 12:
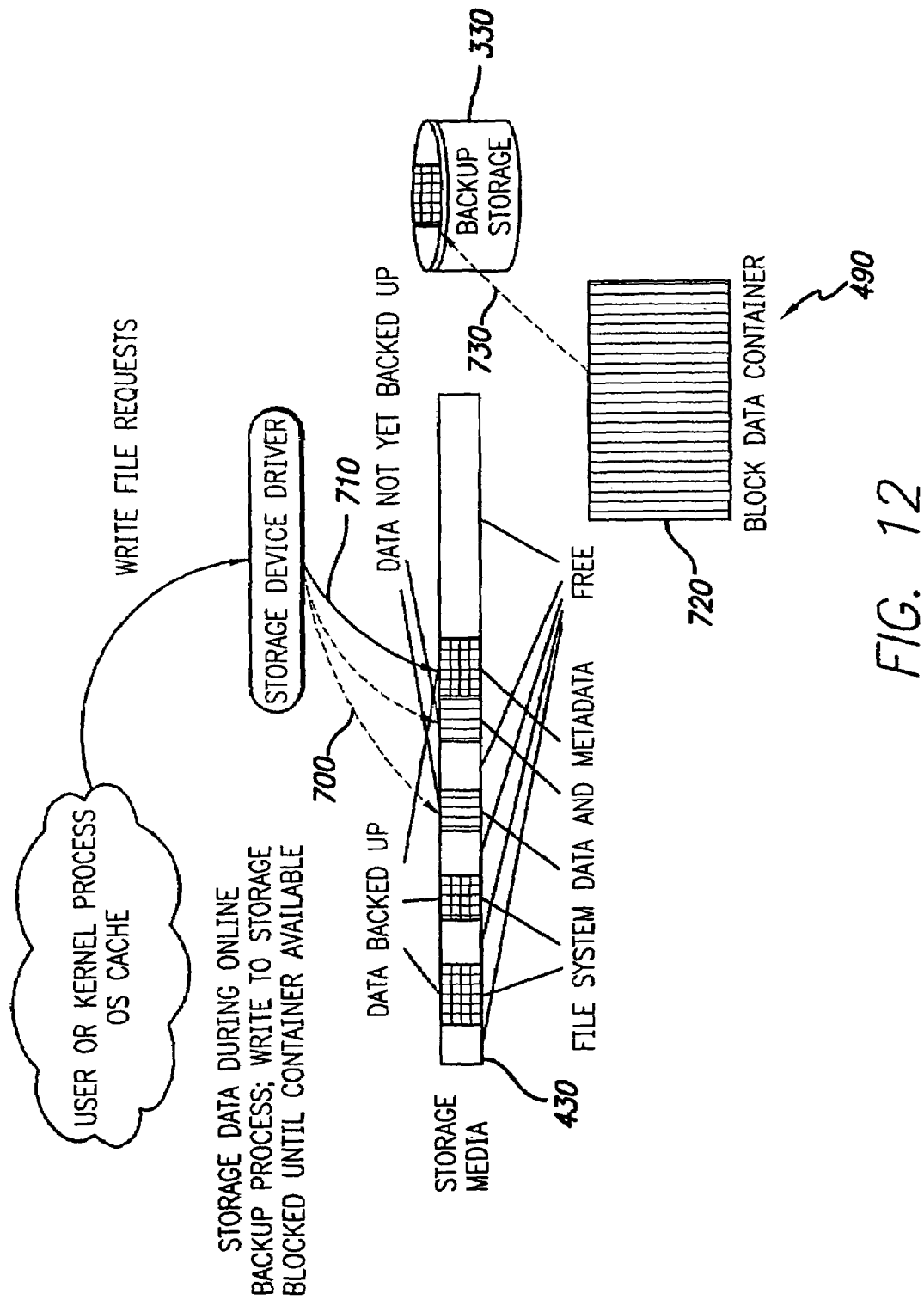
FIG. 12 shows an exemplary embodiment of the data backup process of the present invention.

FIG. 12 illustrates an exemplary embodiment of the present invention to handle an overflow of the block data container. If, during the write process to the intermediate block data container 490, the intermediate block data container 490 overflows, then the data write processes, shown as 700, to the unsaved area of the main storage device 430 should be stopped. In addition, the temporary data, via a write process shown as 720, in intermediate block data container 490 should be written, shown as 730, to the backup storage 330 in order to free space for further storage. But, if the pending write requests 710 are directed to the data in the main data storage 430 that have already been copied, then the execution of these write requests 710 should preferably not be stopped. Note that it is not necessary to flush the container 490 completely into the backup storage 330. Generally, it is sufficient to partially free the container 490 to allow a suspended process to be resumed as soon as possible.

Figure 13:
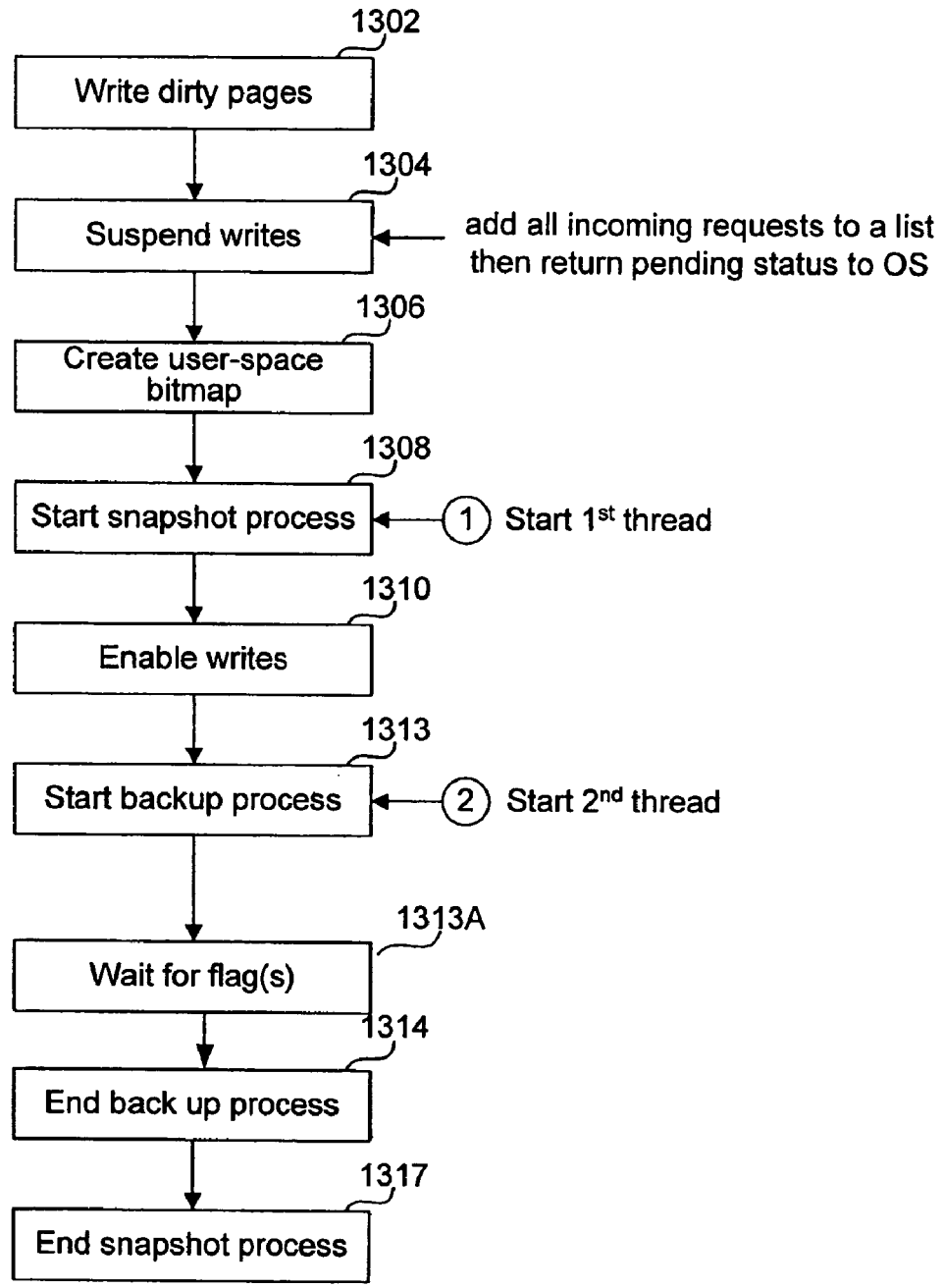
FIG. 13 illustrates an alternative embodiment of the present invention.

FIG. 13 illustrates an alternative embodiment of the present invention. As shown in FIG. 13, the first step is to write the "dirty pages" from the cache to storage (step 1302). Dirty pages are pages in an OS cache that contain information to be written into a storage device, but that have not been written due to an OS policy or other OS mechanisms (for example, a "lazy write" approach used in some modern OS). The next step (step 1304) suspends write operations. These suspended write operations are added to a special list, and a parameter is returned to the operating system, informing the operating system that these write operations have a "pending" status. In other words, the operating system will know that the write command execution has been postponed until later.

In step 1306, a user space bitmap is created. The bitmap is such that the drivers of the operating system are not used to create it. Rather, the storage medium (for example, a disk drive) is read directly, the file system structure is identified, and the data blocks that are being used are identified. It should be noted that although in the exemplary embodiment the bitmap is created on a data block level, it is possible that the bitmap build procedure is related to file system reflection into block space of the storage device, and considers only non-utilized blocks (vs. free blocks). Thus, those data blocks that are being used are tagged with, for example, a 1 in the bitmap, and those that are not used are tagged as 0 in the bitmap. Note that the size of the data block can be relatively large. For example, it may be larger than a typical sector in a hard disk drive. In other words, as discussed further below, there may be a need for a further step that determines which part of the data block is actually being used, if the data block is relatively large. Note that the values used in the bitmap can be not only binary 0 and 1. As another option, for example, the bitmap can be used to store information about bad blocks. Note also that the bitmap can be created and managed in user space, or, alternatively, in OS kernel space.

Figure 14:
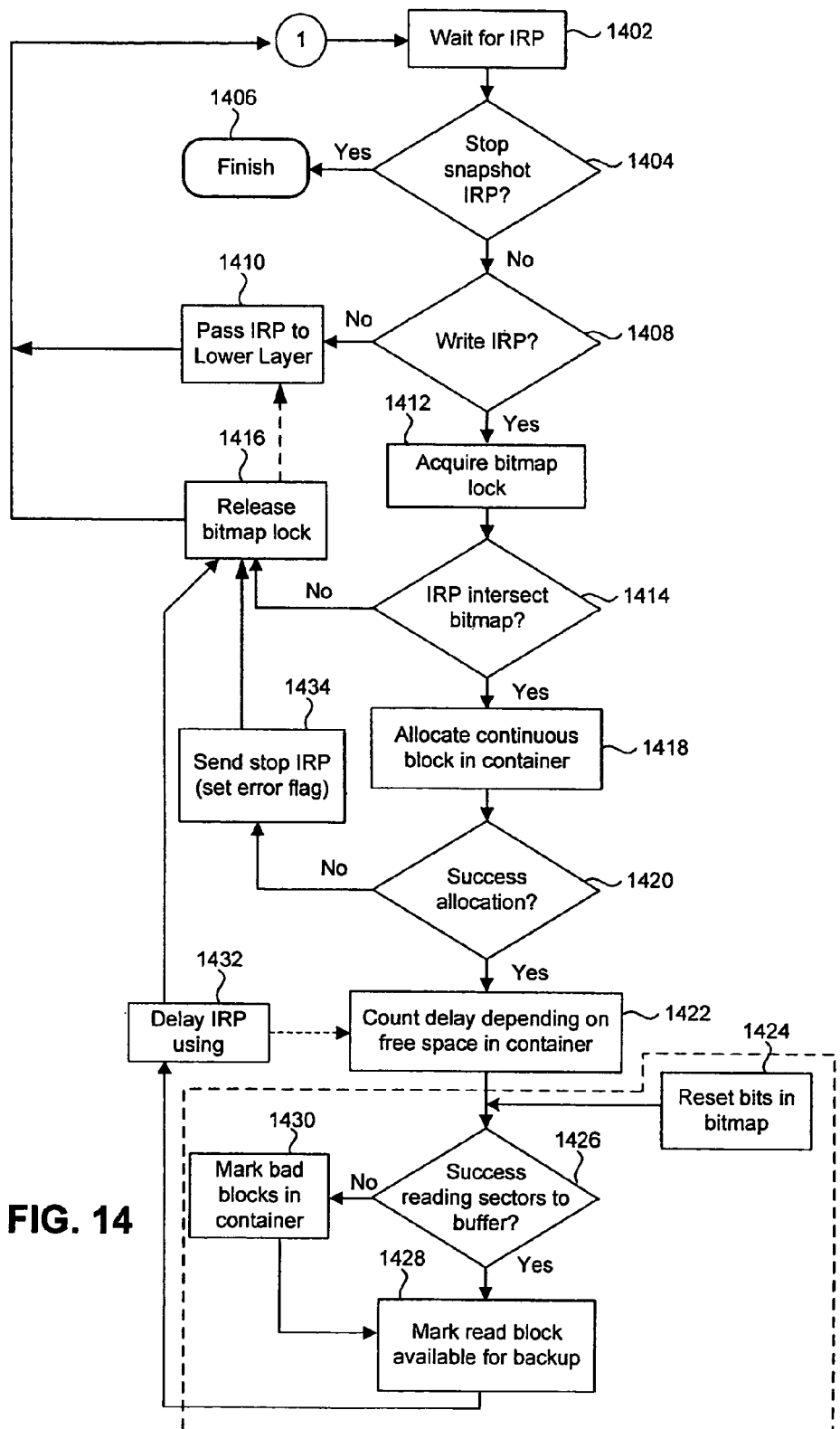
FIG. 14 illustrates the snapshot process of the embodiment of FIG. 13.

In step 1308, the snapshot process begins, typically by initiating a thread, designated by ① in FIG. 13 (see also FIG. 14). Note that the snapshot process may run asynchronously. In other words, once the snapshot process is launched, it can proceed in a separate thread, asynchronously relative to the process illustrated in FIG. 13.

In step 1310, the write operations are enabled. In step 1312, the backup process designated by ② in FIG. 13 is started, see also ② in FIG. 15. Note that the process ② is also in asynchronous process, usually implemented as a thread. Also, note that processes ① and ② can be either synchronous or (preferably) asynchronous relative to each other. Synchronization can be performed using access to the bitmap as a serialization mechanism. In step 1314, once a flag is received that the backup process is completed, the snapshot process ① can end (step 1317).

FIG. 14 illustrates the snapshot process ①. As shown in FIG. 14, in step 1402, the snapshot process waits for the interrupt request packet (IRP). Note that the IRP sometimes goes by different names, but, in general, is a request to the OS kernel to perform some action relating to the storage device, such as a write or a read on the storage device. Once the IRP is received, the IRP is analyzed. If the IRP is a stop-snapshot type IRP (step 1404), then the process terminates (step 1406). If it is not a stop-snapshot IRP, then, in step 1408, the snapshot process ① checks if this is a write IRP. If it is, then in step 1412, the process ① waits for a bitmap lock. In other words, in step 1412, the bitmap is locked, and cannot be altered during the snapshot process ①. If it is not a write IRP, then in step 1410, the IRP is passed to a lower layer (e.g., to the hardware layer of the local HDD) to be performed by the OS in a normal manner.

In step 1414, the process checks if the IRP corresponds to any bits in the bitmap that have been flagged as a used block (with a "1," for example). If not, then the process proceeds to step 1416, releasing the bitmap lock. Otherwise, in step 1418, in the intermediate block container, a space is allocated, such that the space is equal to the amount of data that needs to be stored there. Successful allocation is then checked (step 1420). If the allocation has not been successful, an error flag is set (step 1434), and the process returns to step 1416. The bitmap lock released in step 1416 and operation can either continue (step 1402), or pass the IRP to the lower layer (step 1410). If the allocation in step 1420 has been successful, then a counter to be used in the delay procedure is calculated/recalculated, depending on the amount of free space in the container (step 1422). Meanwhile, the bits in the bitmap are reset (step 1424), and data from the intermediate storage container is read. If the data has been read successfully, (step 1426), the block that is available for backup is marked (step 1428), otherwise, the block is marked as a "bad" block in the container (step 1430). After step 1430, the process proceeds to step 1428.

Note that the IRP can be delayed (step 1432), for example, by using a counter. Note that the delay process 1432 can influence the counter value as well.

Figure 15:
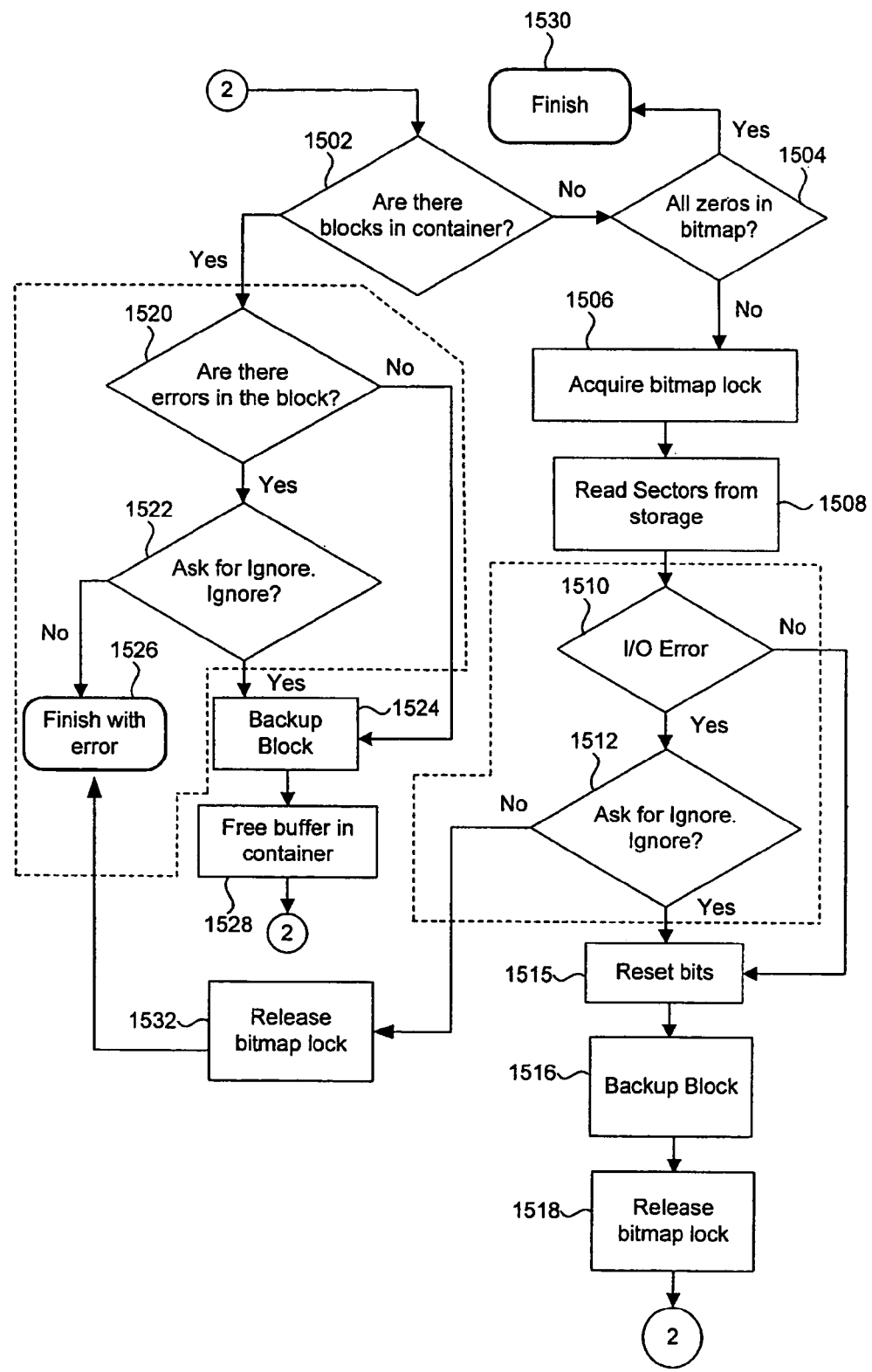
FIG. 15 illustrates the process of working with the intermediate storage container that is used for backup.

FIG. 15 illustrates the process of working with the intermediate storage container that is used for backup. In step 1502, the process checks if there are any blocks in the intermediate storage container already. If there aren't any, then in step 1504, the process checks if the bitmap contains only zeros or does not contain used blocks (note that depending upon implementation—the bitmap can contain bad block marks as well). If Yes, then the process ends in step 1530. If No, the process proceeds to step 1506, which acquires the bitmap lock. Information about a sector from the bitmap in step 1502 is used to address backup procedure to the sector. The sectors are read from storage (step 1508), such that the sector correspond to the flagged bits in a bitmap. In step 1510, if there are no I/O errors, the process proceeds to step 1514, which resets the bits. In case of error, the system asks for user action in step 1512, for example, by creation of a dialog box on the console (e.g., by asking the user: "Error reading disk data. Cancel operation or ignore error?"). Alternatively, the response regarding the action to be taken can be received "in advance" by specifying some pre-defined error recovery policy. In other words, the error is not ignored, but the bitmap acquired in step 1506 is released, and the process is finished (with error).

Then in step 1515, the system resets appropriate bits in the bitmap. In step 1516, the block is backed up, and in step 1518, the bitmap lock is released. In step 1510, if there is an error, (in other words, the particular sector cannot be read), then an error is generated, and some error handling routine 1512 is involved. For example, interactive-input from the user may be requested, or a pre-defined error handling approach may be used. If the received response indicates that the error cannot be ignored, the system finishes operation (step 1526).

In step 1512, if there is no "ignore," the bitmap lock is released (step 1532), and the process finishes with error (step 1526).

In step 1502, if there are copied blocks in the container, the system proceeds with backing it to the backup storage. But, in case of errors in the block (see 1520), the system asks the user (or checks a predefined policy) whether it should ignore the error (step 1522). If, in case of error, the error handling routine in 1522 returns a request to ignore the error, then the block is backed up (step 1524), and a buffer in the container is freed (step 1528). The process can then return back to step 1502. Otherwise, in step 1522, the process finishes with an error (step 1526), as described above.

Figure 16:
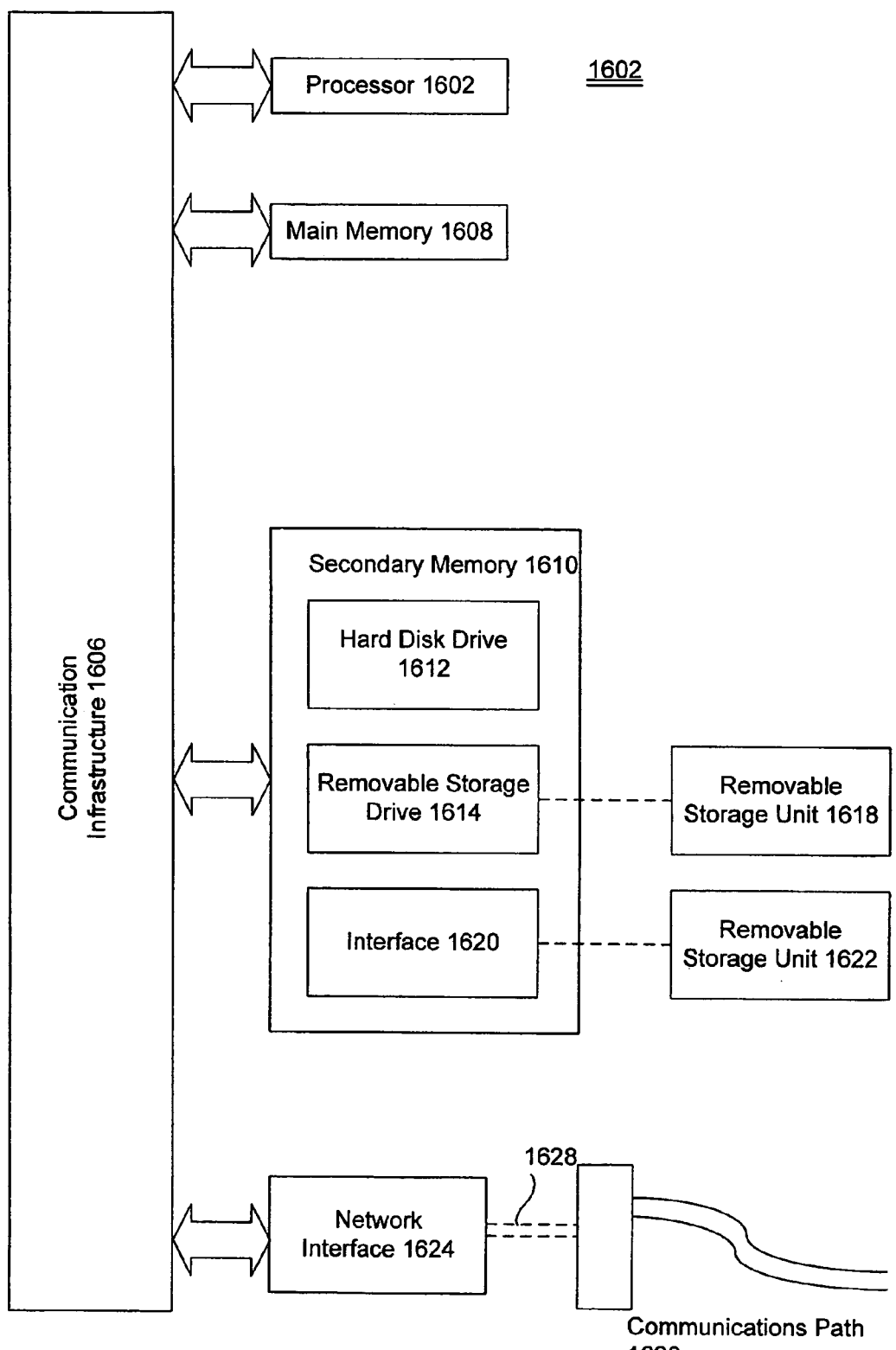
FIG. 16 illustrates an example of a computer architecture that may be used in the present invention.

An example of the server 1602 is illustrated in FIG. 16. The server 1602 includes one or more processors, such as processor 1601. The processor 1601 is connected to a communication infrastructure 1606, such as a bus or network). Various software implementations are described in terms of this exemplary computer system. After reading this description, it will become apparent to a person skilled in the relevant art how to implement the invention using other computer systems and/or computer architectures.

Server 1602 also includes a main memory 1608, preferably random access memory (RAM), and may also include a secondary memory 1610. The secondary memory 1610 may include, for example, a hard disk drive 1612 and/or a removable storage drive 1614, representing a magnetic tape drive, an optical disk drive, etc. The removable storage drive 1614 reads from and/or writes to a removable storage unit 1618 in a well known manner. Removable storage unit 1618 represents a magnetic tape, optical disk, or other storage medium that is read by and written to removable storage drive 1614. As will be appreciated, the removable storage unit 1618 can include a computer usable storage medium having stored therein computer software and/or data.

In alternative implementations, secondary memory 1610 may include other means for allowing computer programs or other instructions to be loaded into server 1602. Such means may include, for example, a removable storage unit 1622 and an interface 1620. An example of such means may include a removable memory chip (such as an EPROM, or PROM) and associated socket, or other removable storage units 1622 and interfaces 1620 which allow software and data to be transferred from the removable storage unit 1622 to server 1602.

Server 1602 may also include one or more communications interfaces, such as communications interface 1624. Communications interface 1624 allows software and data to be transferred between server 1602 and external devices. Examples of communications interface 1624 may include a modem, a network interface (such as an Ethernet card), a communications port, a PCMCIA slot and card, etc. Software and data transferred via communications interface 1624 are in the form of signals 1628 which may be electronic, electromagnetic, optical or other signals capable of being received by communications interface 1624. These signals 1628 are provided to communications interface 1624 via a communications path (i.e., channel) 1626. This channel 1626 carries signals 1628 and may be implemented using wire or cable, fiber optics, an RF link and other communications channels. In an embodiment of the invention, signals 1628 comprise data packets sent to processor 1601. Information representing processed packets can also be sent in the form of signals 1628 from processor 1601 through communications path 1626.

The terms "computer program medium" and "computer usable medium" are used to generally refer to media such as removable storage units 1618 and 1622, a hard disk installed in hard disk drive 1612, and signals 1628, which provide software to the server 1602.

Computer programs are stored in main memory 1608 and/or secondary memory 1610. Computer programs may also be received via communications interface 1624. Such computer programs, when executed, enable the server 1602 to implement the present invention as discussed herein. In particular, the computer programs, when executed, enable the processor 1601 to implement the present invention. Where the invention is implemented using software, the software may be stored in a computer program product and loaded into server 1602 using removable storage drive 1614, hard drive 1612 or communications interface 1624.

This invention provides numerous advantages over conventional backup procedures. The present invention differs from file systems such as Episode and WAFL in that the system and method of the present invention operates at the level of data storage blocks and not at the level of inodes or files. As a result, the present invention is able to provide a faster and more efficient backup process. Moreover, the present invention utilizes a specific container as a means of intermediate data storage for the data that is subject to backup until this data is stored in the backup storage. As a result, the present invention is able to provide an efficient online backup process.

Having thus described a preferred embodiment of the computer network system of the present invention, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computer system operable to provide data backup, comprising:

a storage device operable to store block data;

a backup storage device operable to store block data; and an intermediate block data container operable to store block data, wherein the computer system is operable to copy a data block from the storage device into the intermediate block data container and to copy a data block from the intermediate block data container into the backup storage device during an online data backup process, wherein the computer system is operable to:

create a lockable bitmap of data storage blocks located in the storage device that are subject to the backup process;

copy a data storage block to the backup storage device pursuant to the data storage blocks identified by the bitmap; and in case of error when accessing the storage device, indicate, in the bitmap, that the data storage block is invalid.

2. The computer system of claim 1, wherein the intermediate block data container is located in a memory location that is external to the computer file system.

3. The computer system of claim 2, wherein the intermediate block data container is located in the storage device.

4. The computer system of claim 3, wherein the intermediate block data container is a separate partition of the storage device.

5. The computer system of claim 1, wherein the intermediate block data container is a file within a file system on the storage device.

6. The computer system of claim 5, wherein the file system is further operable to write dirty pages to the storage device before initiating a data backup process.

7. The computer system of claim 1, wherein the computer system is operable to:
suspend a write command to the storage device during the data backup process if the intermediate block data container has reached a selected data capacity; and
copy a selected amount of data from the intermediate block data container to the backup storage device.

8. The computer system of claim 7, further comprising:
a file system driver operable to transmit a write request to write to the storage device; and
a storage device driver program operable to read from the storage device and write to the storage device in block mode in response to the write request.

9. The computer system of claim 8, wherein the file system driver translates a write request addressed to a file located in the storage device and received from a user process into one or more block write operations.

10. The computer system of claim 8, wherein the file system driver transmits a write request received from an operating system process.

11. The computer system of claim 8, wherein the file system driver provides a data block number associated with a block in response to a write command directed to the data block during the online data backup process.

12. The computer system of claim 7, wherein the computer system suspends a write command that is directed to a data storage block that is subject to the data backup process but has not yet been copied, copies the data storage block that is the subject of the write command to the intermediate storage device, executes the write command and copies the data storage block from the intermediate storage device to the backup storage device.

13. The computer system of claim 1, wherein, in the case of error during a write operation, the system continues the copy process.

14. The computer system of claim 1, wherein, in the case of error during a read operation, the system continues the read process.

15. A method for providing an online data backup process for backing up data stored on a storage device associated with a computer system to a backup storage device, comprising:
informing an operating system driver that the data is in a backup state;
creating a lockable bitmap of data blocks located in the storage device that are subject to the online data backup process;
receiving a write operation directed to a block identified by the bitmap;
determining if the data block identified by the bitmap has been copied;
executing the write operation if the data block identified by the bitmap has been copied; and
in case of error of accessing the storage device, marking the block as invalid.

16. The method of claim 15, further comprising:
providing an intermediate data container; and
copying the data block identified by the bitmap from the intermediate data container to the backup storage device.

17. The method of claim 15, further comprising flagging a data block once the data block has been copied to the backup storage device.

18. The method of claim 15, further comprising informing the operating system driver that all of the data blocks subject to the online data backup process have been copied to the backup storage device.

19. The method of claim 15, further comprising receiving a data block number associated with the listed data block upon receiving a write operation directed to a listed data block.

20. The method of claim 15, further comprising writing a dirty page to the storage device before informing an operating system driver that the data is in a backup state.

21. The method of claim 16, wherein the step of providing the intermediate data container further comprises providing a storage device external to the computer system.

22. The method of claim 16, wherein the step of providing the intermediate data container further comprises providing a selected section of the storage device.

23. The method of claim 16, wherein the step of providing the intermediate data container further comprises providing a selected file located in a file system associated with the computer system.

24. The method of claim 16, further comprising:
suspending the write operation if the data block identified by the bitmap has not been copied;
copying the data block identified by the bitmap to the intermediate block data container; and
executing the write operation.

25. The method of claim 24, wherein the step of suspending the write operation if the listed data block has not been copied, further comprises:
determining whether the intermediate block data storage has reached a selected capacity; and
copying a selected portion of the intermediate block data storage to the backup storage device if the intermediate block data storage has reached the selected capacity.

26. The method of claim 16, further comprising, upon receiving an indication that the intermediate data container is close to overload, initiating a temporary slowdown of write operations by slowing down processes whose activity results in write operations into a non-backed-up area.

27. The method of claim 15, wherein the data blocks in the storage device that are subject to the data backup process are all blocks of an underlying storage device used by file system data but not free space blocks.

28. The method of claim 15, further comprising, in the case of error during a write operation, continuing the copy process.

29. The method of claim 15, further comprising, in the case of error during a write operation, continuing the read process.

30. A system for data backup, comprising:
a storage device;
a backup storage device; and
an intermediate storage device,
wherein, a backup procedure is performed on-line and copies data blocks from the storage device into the backup storage device,
wherein, when a write command is directed to a data storage block identified for backup that has not yet been backed up, the identified data storage block is copied from the storage device to the intermediate storage device, the write command is executed on the identified data storage block from the storage device, and the data storage block is copied from the intermediate storage device to the backup storage device, and
wherein, in case of an error accessing a block on the storage device, the block is marked as invalid.

31. The system of claim 30, wherein the intermediate storage device is external to a file system of a computer that includes the storage device.

32. The system of claim 31, wherein the intermediate storage device is located in the storage device.

33. The system of claim 32, wherein the intermediate storage device is a separate partition of the storage device.

34. The system of claim 31, wherein the intermediate storage device is a file within a file system.

35. The system of claim 34, wherein the file system writes dirty pages to the storage device before initiating a data backup process.

36. The system of claim 31, wherein the system:
suspends a write command to the storage device during the data backup process if the intermediate storage device has reached a selected data capacity; and
copies a selected amount of data from the intermediate storage device to the backup storage device.

37. The system of claim 31, further comprising:
a file system driver used for transmitting the write command to the storage device; and
a storage device driver used for reading from the storage device and writing to the storage device in block mode in response to the write command.

38. The system of claim 37, wherein the file system driver translates the write command received from a user process and addressed to a file located in the storage device into one or more block write operations.

39. The system of claim 37, wherein the file system driver transmits the write command received from an operating system process.

40. The system of claim 37, wherein the file system driver provides a data block number associated with a block in response to the write command directed to the data block during an online backup.

41. The system of claim 30, further comprising means for slowing down processes whose activity results in write operations into a non-backed-up area, in response to an indication that the intermediate storage device is close to overload.

42. The system of claim 30, wherein data blocks in the storage device that are subject to the online data backup process includes all blocks of an underlying storage device used by file system data and does not include free space blocks.

43. The system of claim 30, wherein backed up data blocks are restored on-the-fly to a different storage device.

44. The system of claim 30, wherein an order in which data blocks are scheduled for backup is changed based on information received from an external source.

45. The system of claim 30, wherein, in the case of error during a write operation, the system continues the copy process.

46. The system of claim 30, wherein, in the case of error during a read operation, the system continues the read process.

47. A method for providing an online data backup, comprising:
identifying data blocks in a storage device subject to online data backup;
receiving a write command directed to an identified data block;
determining if the identified data block has been copied;
proceeding with a write operation if the identified data block has been copied; and
in case of error accessing the storage device, computer program code means for marking corresponding blocks as invalid and continuing access operations with other blocks in the storage device.

48. The method of claim 47, further comprising the step of copying the identified data block from the intermediate storage to a backup storage device.

49. The method of claim 47, further comprising flagging a data block once the data block has been copied to the backup storage device.

50. The method of claim 47, further comprising informing an operating system driver that all the identified data blocks have been copied to the backup storage device.

51. The method of claim 47, further comprising receiving a data block number associated with the identified data block upon receiving the write command directed to the identified data block.

52. The method of claim 47, further comprising writing a dirty page to the storage device before informing an operating system driver that the data is in the backup state.

53. The method of claim 47, wherein the step of copying comprises copying the identified data block to intermediate storage, wherein the intermediate storage comprises an external storage device.

54. The method of claim 47, wherein the step of copying comprises copying the identified data block to intermediate storage, wherein the intermediate storage comprises a selected partition of the storage device.

55. The method of claim 47, wherein the step of copying comprises copying the identified data block to intermediate storage, wherein the intermediate storage comprises a selected file located in a file system associated with the computer system.

56. The method of claim 47, further comprising:
suspending the write operation if the identified data block has not been copied;
copying the identified data block to an intermediate storage; and
executing the write operation on the data block in the intermediate storage.

57. The method of claim 56, wherein suspending the write operation comprises:
determining whether the intermediate storage has reached a selected capacity;
copying a selected portion of the intermediate storage to the backup storage device if the intermediate storage has reached the selected capacity; and
freeing up available space in the intermediate storage.

58. The method of claim 56, further comprising, upon receiving an indication that the intermediate data storage is close to overload, slowing down processes whose activity results in write operations into a non-backed-up area.

59. The method of claim 47, wherein data blocks located in the storage device that are subject to the online data backup process are all blocks of an underlying storage device used by file system data but not free space blocks.

60. The method of claim 47, further comprising informing an operating system driver that data in a storage device is in a backup state.

61. The method of claim 47, wherein backed up data blocks are restored on the fly to a different storage device.

62. The method of claim 47, wherein an order in which data blocks are scheduled for backup is changed based on information received from an external source.

63. The method of claim 47, further comprising creating a lockable bitmap of data blocks located in the storage device that are subject to the backup process.

64. A computer program product for providing an online data backup, the computer program product comprising a computer useable medium having computer program logic recorded thereon for controlling a processor, the computer program logic comprising:
- computer program code means for identifying data blocks in a storage device subject to online data backup;
- computer program code means for receiving a write command directed to an identified data block;
- computer program code means for determining if the identified data block has been copied;
- computer program code means for proceeding with a write operation if the identified data block has been copied; and
- computer program code means for marking corresponding blocks as invalid in case of error accessing the storage device, and continuing access operations with other blocks in the storage device.

* * * * *